(12) United States Patent
Yoshiume et al.

(10) Patent No.: US 10,718,290 B2
(45) Date of Patent: Jul. 21, 2020

(54) DEVICE FOR CONTROLLING FUEL INJECTION IN INTERNAL COMBUSTION ENGINE

(71) Applicant: DENSO CORPORATION, Kariya, Aichi-pref. (JP)

(72) Inventors: Naoki Yoshiume, Kariya (JP); Makoto Tanaka, Kariya (JP); Keisuke Yanoto, Kariya (JP); Kosuke Nakano, Kariya (JP)

(73) Assignee: DENSO CORPORATION, Kariya (JP)

( * ) Notice: Subject to any disclaimer, the term of this patent is extended or adjusted under 35 U.S.C. 154(b) by 94 days.

(21) Appl. No.: 15/745,465

(22) PCT Filed: Jun. 14, 2016

(86) PCT No.: PCT/JP2016/002870
§ 371 (c)(1),
(2) Date: Jan. 17, 2018

(87) PCT Pub. No.: WO2017/013830
PCT Pub. Date: Jan. 26, 2017

(65) Prior Publication Data
US 2018/0209373 A1 Jul. 26, 2018

(30) Foreign Application Priority Data
Jul. 23, 2015 (JP) ................................. 2015-145870

(51) Int. Cl.
*F02D 41/40* (2006.01)
*F02D 41/20* (2006.01)
(Continued)

(52) U.S. Cl.
CPC ............. *F02D 41/403* (2013.01); *F01N 3/36* (2013.01); *F02D 41/0255* (2013.01);
(Continued)

(58) Field of Classification Search
CPC ............... F02D 41/403; F02D 41/2467; F02D 41/1454; F02D 41/405; F02D 41/1486;
(Continued)

(56) References Cited

U.S. PATENT DOCUMENTS 4,015,563 A * 4/1977 Drews ................... F02D 41/182
123/485
4,193,380 A * 3/1980 Marchak ............... F02D 41/005
123/179.15
4,212,066 A * 7/1980 Carp ....................... F02D 41/06
123/486
(Continued)

FOREIGN PATENT DOCUMENTS

JP 2010-073705 4/2010
JP 2010-532448 10/2010
(Continued)

*Primary Examiner* — Hung Q Nguyen
*Assistant Examiner* — Susan E Scharpf
(74) *Attorney, Agent, or Firm* — Nixon & Vanderhye P.C.

(57) ABSTRACT

A control device for controlling a fuel injection in an internal combustion engine provided with a fuel injection valve has a driving portion supplying an electric power to a terminal of the fuel injection valve so as to drive the fuel injection valve to be opened; a current detecting portion detecting a drive current flowing through the fuel injection valve when the fuel injection valve is driven to be opened; a voltage detecting portion detecting a terminal voltage of the terminal of the fuel injection valve; a correction portion correcting the electric power supplied by the driving portion so that an actual value of the drive current detected by the current detecting portion agrees with a target value; a valve close detecting portion detecting a valve closing timing of the fuel injection valve based on the terminal voltage detected by the voltage detecting portion in a condition where the electric power supplied by the driving portion is corrected by the correction portion.

14 Claims, 21 Drawing Sheets

(51) Int. Cl.
*F02M 51/06* (2006.01)
*F02D 41/34* (2006.01)
*F01N 3/36* (2006.01)
*F02M 61/10* (2006.01)
*F02D 41/24* (2006.01)
*F02D 41/14* (2006.01)
*F02D 41/02* (2006.01)
*F01N 3/10* (2006.01)

(52) U.S. Cl.
CPC ..... *F02D 41/1454* (2013.01); *F02D 41/1486* (2013.01); *F02D 41/20* (2013.01); *F02D 41/2467* (2013.01); *F02D 41/34* (2013.01); *F02D 41/405* (2013.01); *F02M 51/06* (2013.01); *F02M 61/10* (2013.01); *F01N 3/101* (2013.01); *F02D 2041/2051* (2013.01); *F02D 2041/2055* (2013.01); *F02D 2041/2058* (2013.01); *Y02T 10/22* (2013.01); *Y02T 10/44* (2013.01)

(58) Field of Classification Search
CPC ...... F02D 41/0255; F02D 41/34; F02D 41/20; F02D 2041/2051; F02D 2041/2058; F02D 2041/2055; F01N 3/36; F01N 3/101; F02M 61/10; F02M 51/06; Y02T 10/22; Y02T 10/44
See application file for complete search history.

(56) References Cited

U.S. PATENT DOCUMENTS

| | | | | |
|---|---|---|---|---|
| 4,278,061 | A | * | 7/1981 | Werner ................. F02D 41/182 123/483 |
| 5,950,419 | A | * | 9/1999 | Nishimura .......... F02D 41/0255 60/274 |
| 6,532,940 | B1 | * | 3/2003 | Ono ........................ F02D 41/20 123/490 |
| 9,920,703 | B2 | * | 3/2018 | Katsurahara ........ F02D 41/2467 |
| 2003/0071613 | A1 | | 4/2003 | Schultz et al. |
| 2008/0308065 | A1 | * | 12/2008 | Imai .................... F02D 41/1497 123/299 |
| 2014/0238354 | A1 | | 8/2014 | Imai |
| 2016/0177855 | A1 | * | 6/2016 | Kusakabe .......... F02M 51/0685 123/490 |
| 2016/0237935 | A1 | | 8/2016 | Tanaka et al. |
| 2016/0237937 | A1 | | 8/2016 | Kusakabe et al. |
| 2016/0245211 | A1 | | 8/2016 | Katsurahara et al. |
| 2016/0252035 | A1 | | 9/2016 | Katsurahara et al. |
| 2016/0252037 | A1 | | 9/2016 | Katsurahara |
| 2017/0002765 | A1 | | 1/2017 | Nakano et al. |
| 2017/0009689 | A1 | | 1/2017 | Imai |
| 2017/0191437 | A1 | | 7/2017 | Yanoto |
| 2017/0226950 | A1 | | 8/2017 | Tanaka |
| 2017/0226951 | A1 | | 8/2017 | Yanoto |

FOREIGN PATENT DOCUMENTS

| | | |
|---|---|---|
| JP | 2010-249069 | 11/2010 |
| JP | 2011-252473 | 12/2011 |
| JP | 2014-163278 | 9/2014 |
| JP | 2015-063928 | 4/2015 |
| JP | 2015-075087 | 4/2015 |
| JP | 2015-096720 | 5/2015 |
| JP | 2015-096722 | 5/2015 |
| WO | WO 1994/013991 | 6/1994 |
| WO | WO 2016/174820 | 11/2016 |

* cited by examiner

FIG. 14
(a) BEFORE CORRECTION
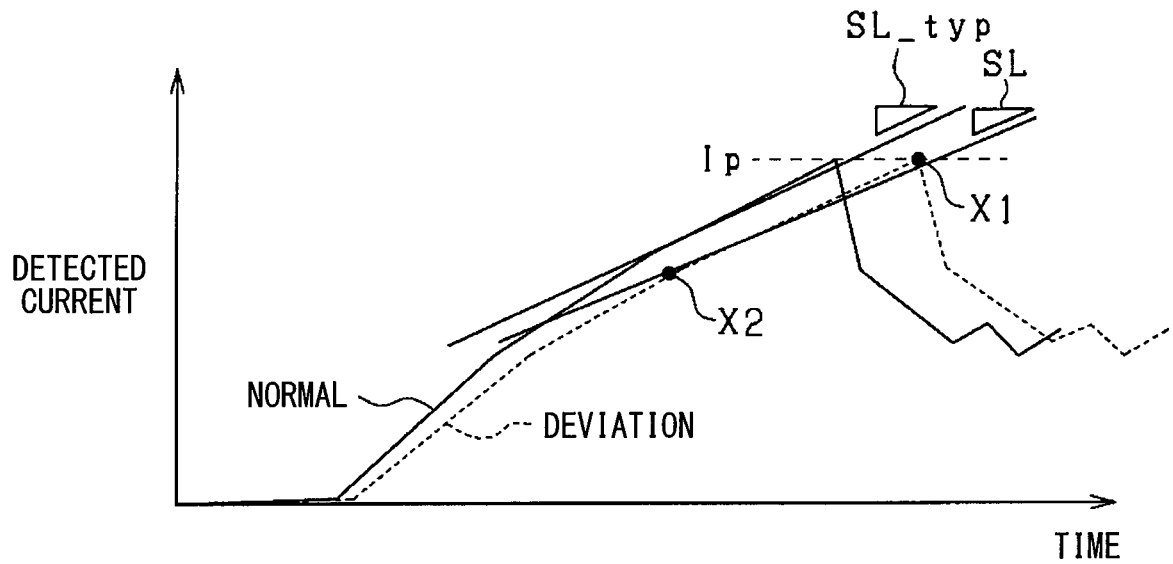
(b) AFTER CORRECTION
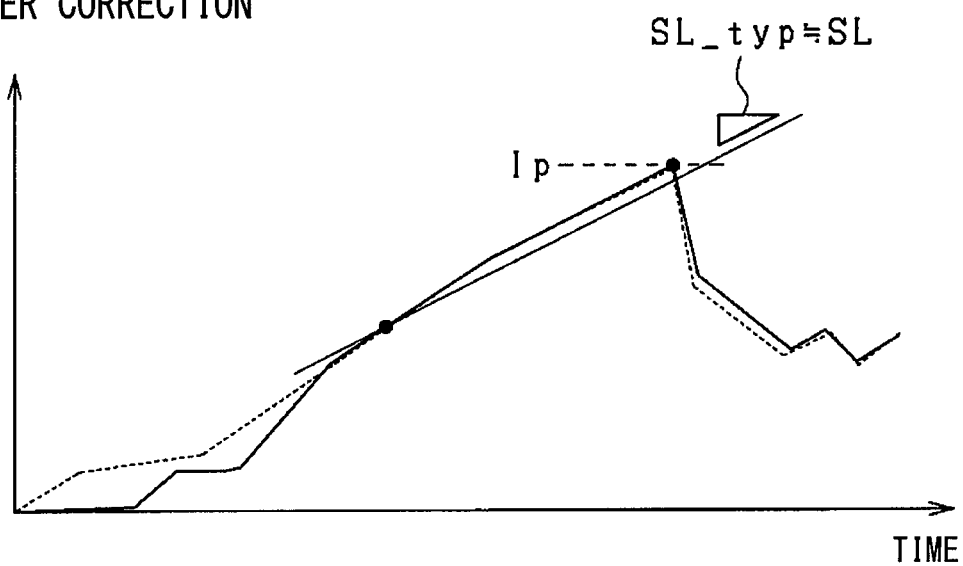

DEVICE FOR CONTROLLING FUEL INJECTION IN INTERNAL COMBUSTION ENGINE

CROSS REFERENCE TO RELATED APPLICATION

This application is the U.S. national phase of International Application No. PCT/JP2016/002870 filed on Jun. 14, 2016, which designated the U.S. and claims priority to Japanese Patent Application No. 2015-145870 filed on Jul. 23, 2015, the entire contents of each of which are incorporated herein by reference.

TECHNICAL FIELD

The present disclosure relates to a control device for controlling a fuel injection in internal combustion engine.

BACKGROUND ART

Conventionally, it is known that an opening of a fuel injection valve is detected based on a variation in electric current flowing through a solenoid of an electromagnetic fuel injection valve (refer to Patent Literature 1). In an electromagnetic valve shown in Patent Literature 1, an valve opening is detected based on a variation in solenoid current which is generated when an armature of a fuel injection valve is mechanically abuts on a stopper at a full-close position.

That is, if the armature does not mechanically abut on the stopper, the opening of the fuel injection valve cannot be detected. When a valve body of the fuel injection valve does not reach the full-close position at a partial lift injection, the opening of the fuel injection valve cannot be detected, so that a valve opening operation cannot be corrected.

PRIOR ART LITERATURES

Patent Literature

Patent Literature 1: WO 94/13991

SUMMARY OF INVENTION

It is an object of the present disclosure to provide a control device for controlling a fuel injection in internal combustion engine, which is able to correct a valve opening operation and to detect a valve closing timing correctly at a partial lift injection.

According to one aspect of the present disclosure, a control device includes: a driving portion supplying an electric power to a terminal of a fuel injection valve so as to drive the fuel injection valve to be opened; a current detecting portion detecting a drive current flowing through the fuel injection valve when the fuel injection valve is driven to be opened; a voltage detecting portion detecting a terminal voltage of the terminal of the fuel injection valve; a correction portion correcting the electric power supplied by the driving portion so that an actual value of the drive current detected by the current detecting portion agrees with a target value; and a valve close detecting portion detecting a valve closing timing of the fuel injection valve based on the terminal voltage detected by the voltage detecting portion in a condition where the electric power supplied by the driving portion is corrected by the correction portion.

According to the above configuration, an electric power is supplied to the terminal of the fuel injection valve by the driving portion, so that the fuel injection valve is opened. The current detecting portion detects a drive current flowing through the fuel injection valve. The voltage detecting portion detects the terminal voltage of the terminal of the fuel injection valve.

The correction portion corrects the electric power supplied by the drive portion in order that the actual value of the drive current detected by the current detecting portion agrees with the target value. Thus, even when the detected value of the driving current detected by the current detecting portion deviates from the actual value, or a flow easiness of the drive current for the fuel injection valve is varied, the actual value of the drive current can be approximated the target value. Thus, a dispersion in valve opening operation of the fuel injection valve can be restricted. Furthermore, since the electric power supply from the drive portion is corrected so that the actual value of the driving current agrees with the target value, it is unnecessary to bring the fuel injector valve to a full close position, which is applicable to the partial lift injection.

In a condition where the electric power supplied by the drive portion is corrected by the correction portion, the valve close detecting portion detects the valve closing timing of the fuel injection valve based on the terminal voltage detected by the voltage detecting portion. Thus, in a condition where a dispersion in valve opening operation of the fuel injection valve is restricted, the valve closing timing can be detected, so that the valve closing timing can be detected with high accuracy. The valve closing timing of the fuel injection valve can be detected based on a fact in which a variation characteristics of the induced electromotive force generated after the fuel injection valve is deenergized is varied at the valve closing timing.

BRIEF DESCRIPTION OF DRAWINGS

The above and other objects, features and advantages of the present disclosure will become more apparent from the following detailed description made with reference to the accompanying drawings.

FIG. 14 is a time chart showing a pre-charge correction.

EMBODIMENTS FOR CARRYING OUT INVENTION

Hereinafter, an embodiment will be described with reference to drawings. In the present embodiment, a control system is applied for controlling a gasoline engine for a vehicle.

Figure 1:
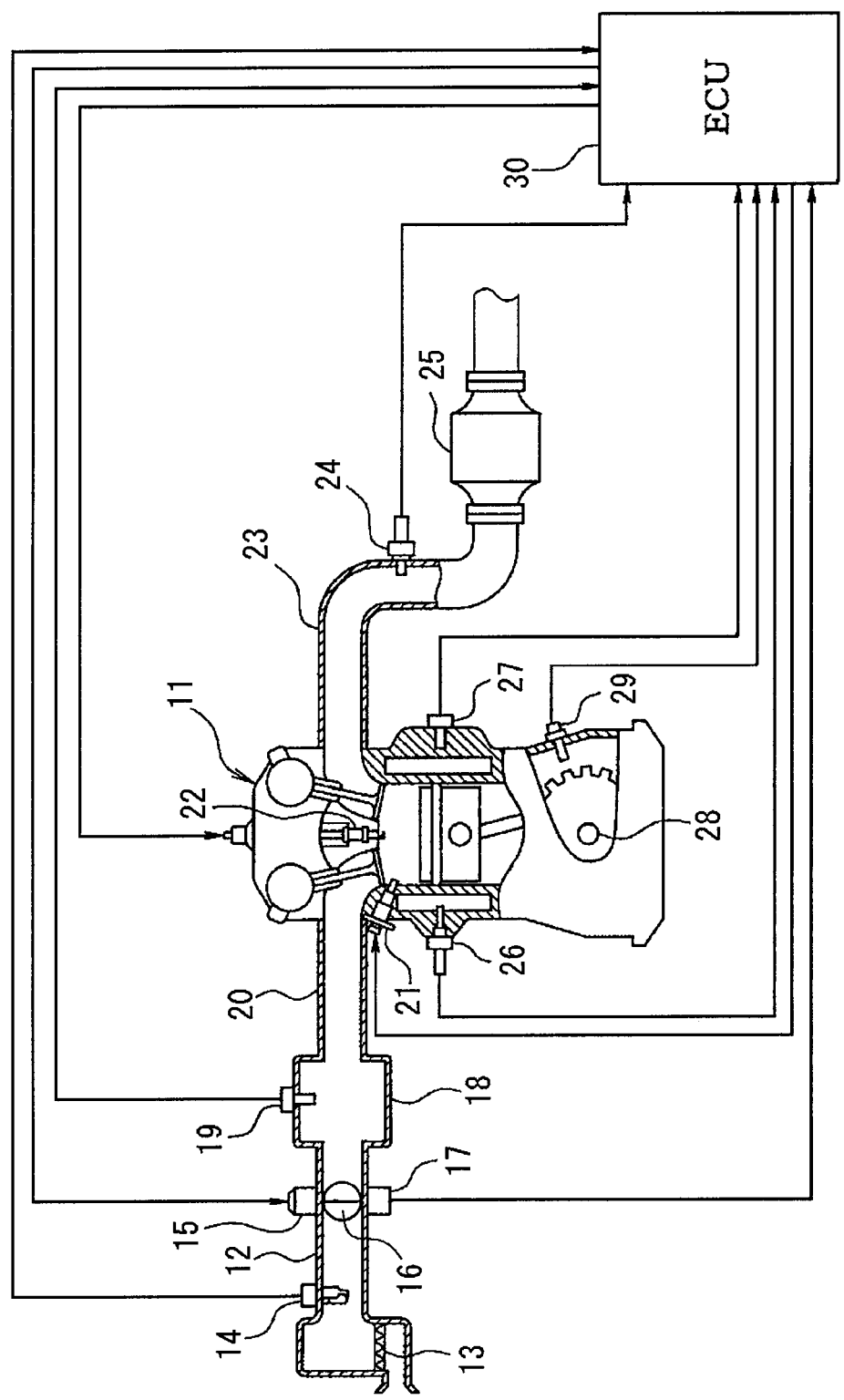
FIG. 1 is a chart showing a schematic configuration of an engine control system.

First, referring to FIG. 1, an engine control system is schematically explained.

An engine 11 is a multi-cylinder internal combustion engine of direct injection. An air cleaner 13 is disposed at a most upstream portion of an intake pipe 12. An air flow meter 14 detecting an intake air quantity is disposed downstream of the air cleaner 13. A throttle valve 16 driven by a DC-motor 15 and a throttle position sensor 17 detecting a throttle position are disposed downstream of the air flow meter 14.

A surge tank 18 is provided downstream of the throttle valve 16, and an intake pressure sensor 19 detecting an intake pressure is provided to the surge tank 18. An intake manifold 20 is connected to the surge tank 18 to introduce intake air into each cylinder of the engine 11. Each cylinder of the engine 11 is provided with a fuel injection valve 21 for injecting a fuel into the cylinder directly. The fuel injection valve 21 is an electromagnetic valve. An ignition plug 22 is disposed to a cylinder head of the engine 11 for each cylinder in order to ignite air-fuel mixture in each cylinder.

An exhaust gas sensor 24 (an air-fuel ratio sensor, an oxygen sensor, etc.) is disposed in an exhaust pipe (exhaust passage) 23 of the engine 11 for detecting an air-fuel ratio, or rich/lean of an air-fuel mixture based on exhaust gas. A catalyst 25 of a three-way catalyst which purifies exhaust gas is provided downstream of the exhaust gas sensor 24.

A coolant temperature sensor 26 detecting coolant temperature and a knock sensor 27 detecting knocking are provided to a cylinder block of the engine 11. A crank angle sensor 29 is disposed around a crankshaft 28. The crank angle sensor 29 outputs a pulse signal when the crankshaft 28 rotates a specified crank angle. Based on the crank angle signal, the crank angle and the engine speed are detected.

Outputs of the sensors are transmitted to an ECU 30. The ECU 30 is an electronic control unit including a microcomputer. The ECU 30 executes each control of the internal combustion engine based on the detected signal of each sensor. The ECU 30 computes a fuel injection quantity according to an engine driving condition, and controls a fuel injection by the fuel injection valve 21 and an ignition timing of the ignition plug 22.

Figure 2:
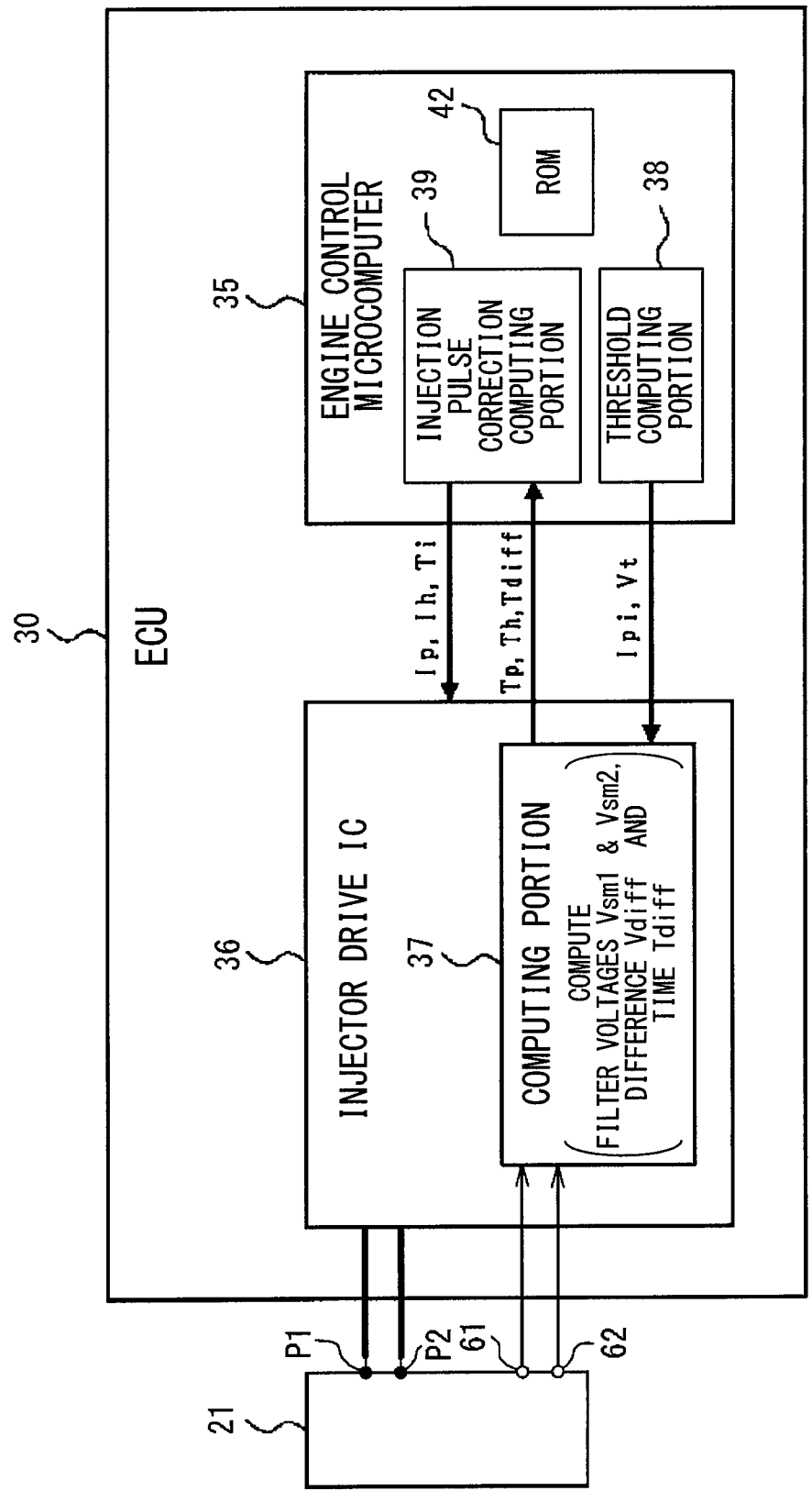
FIG. 2 is a block diagram showing a configuration of a control device for controlling a fuel injection.

As shown in FIG. 2, the ECU 30 includes an engine control microcomputer 35 (microcomputer for controlling the engine 11) and an injector drive IC 36 (IC for driving the fuel injection valve 21). The injector drive IC 36 (driving portion) applies a low voltage V1 and a high voltage V2 to a drive coil of the fuel injection valve 21 through terminals P1, P2 of the fuel injection valve 21 (that is, an electric power is supplied to the drive coil).

The engine control microcomputer 35 computes a required fuel injection quantity according to the engine driving condition (for example, an engine speed, an engine load, etc.), and computes a required injection pulse width Ti (injection period) according to the required fuel injection quantity. The injector drive IC 36 drives the fuel injection valve 21 with the required injection pulse width Ti corresponding to the required fuel injection quantity, so that the fuel injection valve 21 injects the fuel of the required fuel injection quantity.

Moreover, the ECU 30 executes a catalyst warming-up control for promoting a temperature rise of the catalyst 25 until a catalyst temperature exceeds a specified temperature after an ignition switch of the engine 11 is turned on. In the catalyst warming-up control, a pilot-injection by the fuel injection valve 21 is performed in an intake stroke, and an after-injection by the fuel injection valve 21 is performed in a compression stroke, whereby a thin stratified charge combustion by the ignition plug 22 is conducted. Furthermore, during the thin stratified charge combustion, the ignition timing is advanced to raise a temperature of the catalyst 25. The pilot-injection may be performed multiple times in the intake stroke, and the after-injection may be performed multiple times in the compression stroke.

Furthermore, the ECU 30 (an air-fuel-ratio control portion) performs an air-fuel-ratio F/B control in which the air-fuel ratio is controlled to a target air-fuel ratio. In the air-fuel-ratio F/B control, the required injection pulse width Ti (injection period) is computed so that the air-fuel ratio agrees with the target air-fuel ratio.

The injector drive IC 36, an electric current sensor 61, a voltage sensor 62, and the microcomputer 35 constitute the control device for controlling a fuel injection.

Figure 3:
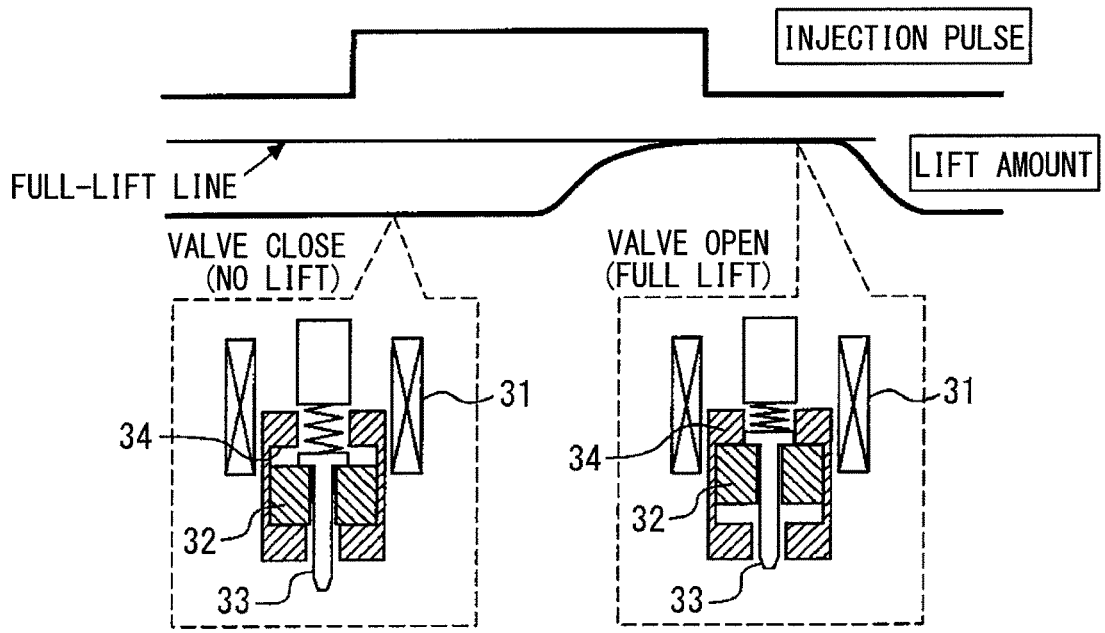
FIG. 3 is a chart showing a fuel injection valve in a full lift condition.
Figure 4:
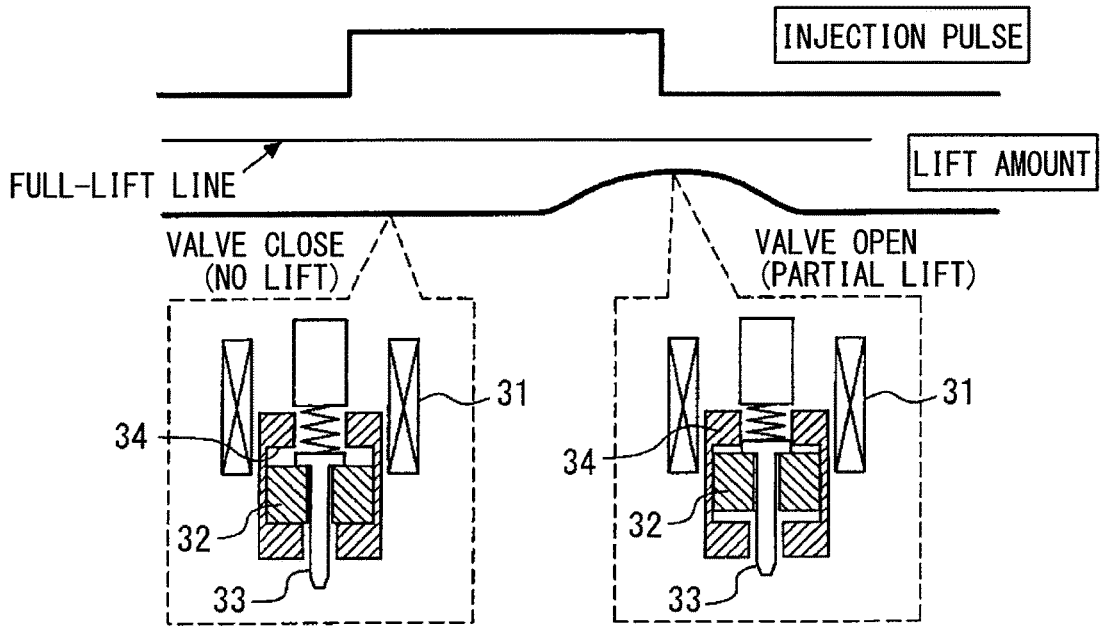
FIG. 4 is a chart showing a fuel injection valve in a partial lift condition.

Moreover, according to the present embodiment, a partial lift injection is performed. In the partial lift injection, a lift of a valve body of the fuel injection valve 21 is terminated before the valve body lifted up to a full lift position. Then, a desired fuel quantity is injected through the fuel injection valve 21. Referring to FIG. 3, the partial lift injection will be described, hereinafter. FIG. 3 shows an operation of the fuel injection valve in a full lift injection, and FIG. 4 shows an operation of the fuel injection valve in a partial lift injection.

As shown in FIG. 3, the fuel injection valve 21 has a drive coil 31 generating an electromagnetic force when energized, and a needle 33 (valve body) driven along with a plunger 32 (movable core) by mean of the electromagnetic force. When the needle 33 moves to a valve opening position, the fuel injection valve 21 is opened to perform a fuel injection. The injection pulse time (energization period) in FIG. 3 is different from that in FIG. 4. When the injection pulse width is relatively long (a needle lift amount is a full lift amount) as shown in FIG. 3, the needle 33 moves to a full lift position (the plunger 32 abuts on the stopper 34). Meanwhile, when the injection pulse width is relatively short (the needle lift amount is a partial lift amount) as shown in FIG. 4, the needle 33 moves to a partial lift position at which the needle 33 does not reach the full lift position (the plunger 32 does not abut on the stopper 34). When the drive coil 31 is deenergized along with a falling of the injection pulse, the plunger 32 and the needle 33 return to the valve closing position. The fuel injection valve 21 is closed and the fuel injection is terminated.

Figure 5:
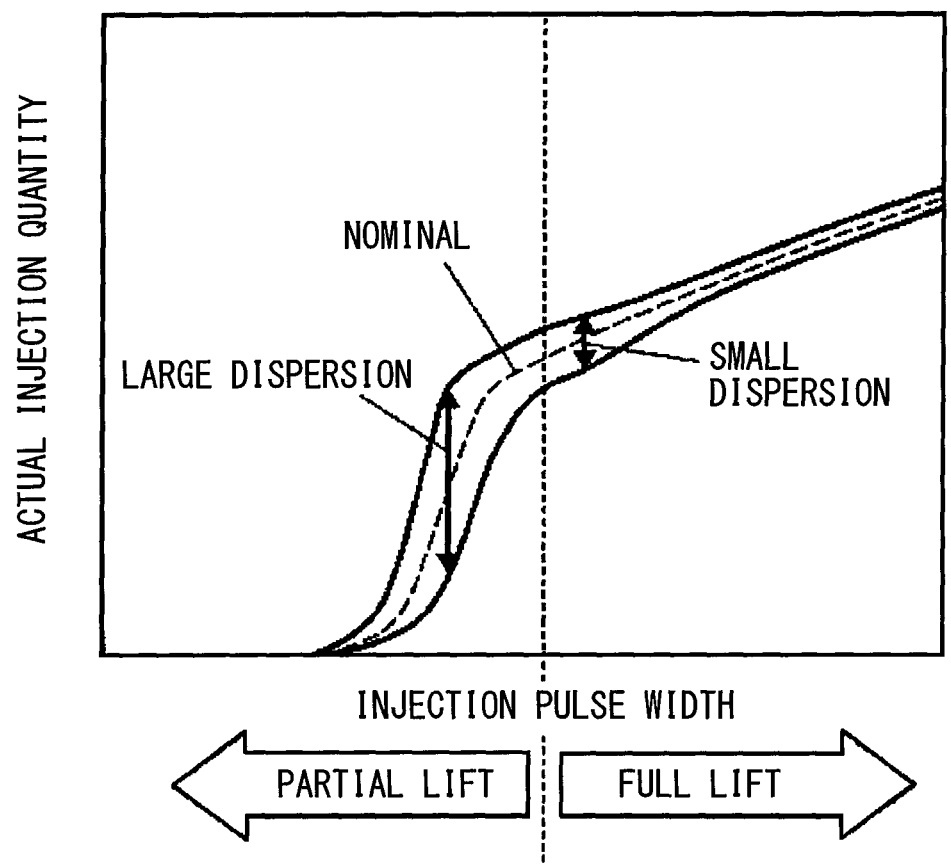
FIG. 5 is a chart showing a relationship between an injection pulse width and an actual injection quantity of a fuel injection valve.

As to the fuel injection valve 21 for the direct injection engine 11, as shown in FIG. 5, a linearity of variation character of the actual injection quantity relative to the injection pulse width may be deteriorated in a partial lift range (the injection pulse is short and the lift amount of the needle 33 does not reach the full lift position). In the partial lift range, the lift amount of the needle 33 disperses and the injection quantity also disperses, which may deteriorate exhaust emission and drivability.

Referring back to FIG. 2, the electric current sensor 61 (a current detecting portion) detects an electric current value flowing through the drive coil 31 of the fuel injection valve 21. The detected current value is successively transmitted to a computing portion 37 of the drive IC 36. The voltage sensor 62 (a voltage detecting portion) detects a negative terminal voltage of the drive coil 31 of the fuel injection valve 21. The detected voltage value is successively transmitted to the computing portion 37 of the drive IC 36.

Figure 8:
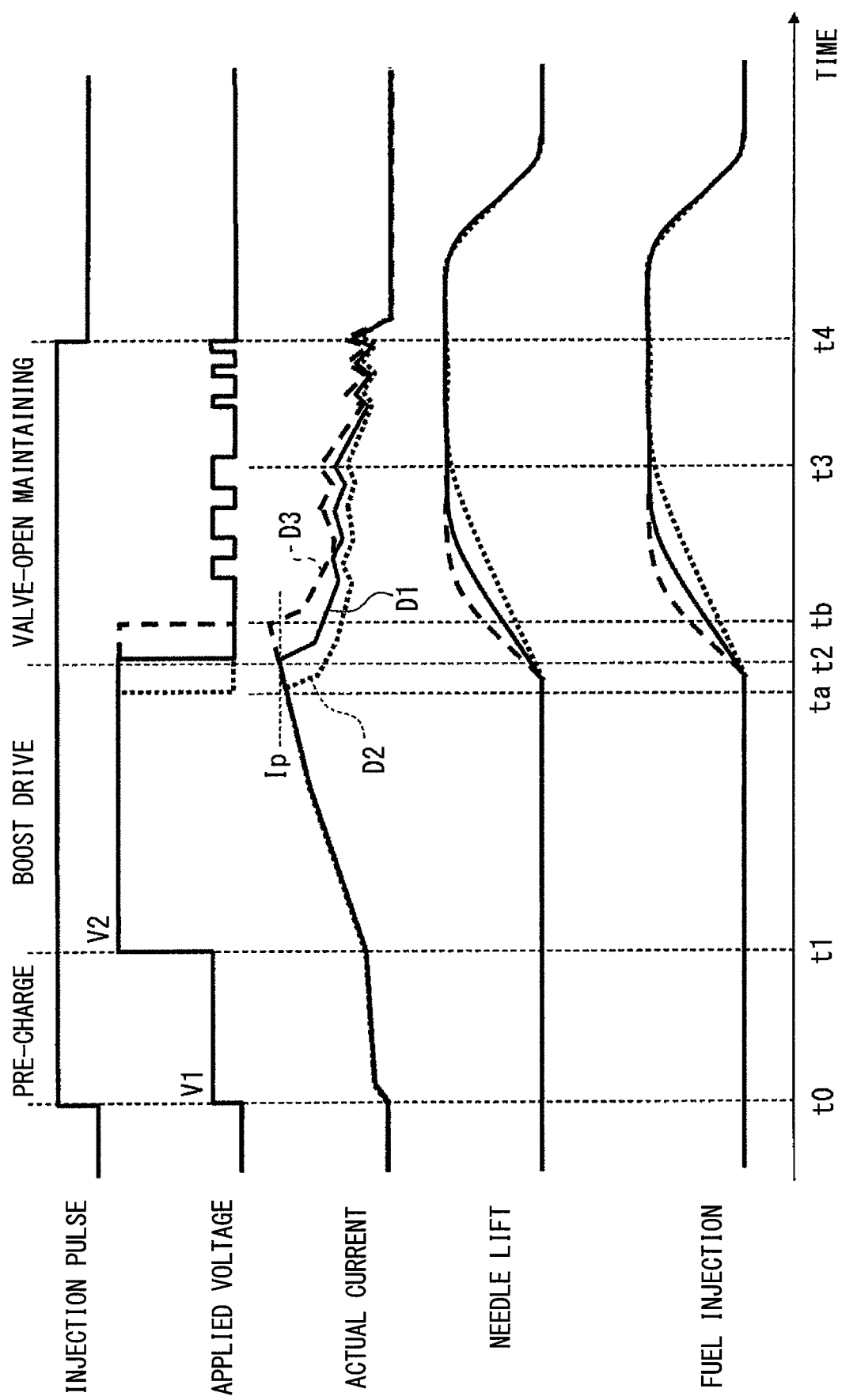
FIG. 8 is a time chart showing a driving operation of a fuel injection valve.

Referring to FIG. 8, a drive operation of the fuel injection valve 21 conducted by the drive IC 36 and the microcomputer 35 based on the injection pulse will be described in detail. During a period in which the injection pulse is on, a pre-charge, a boost drive and a valve-open maintaining drive are performed in series. In the pre-charge, a low voltage V1 is applied to the drive coil 31 before applying a high voltage V2 when the fuel injection valve 21 is energized. By performing the pre-charge, a time period for the coil current to reach the target peak value is shortened. The boost drive is performed in order to improve a valve opening responsiveness. During a period of the boost drive, the high voltage V2 is applied to the drive coil 31. The valve-open maintaining drive is performed successively to the boost drive, and the low voltage V1 is applied to the drive coil 31. A basic operation of the fuel injection is described by a solid line in FIG. 8.

In FIG. 8, the injection pulse is turned on at a time t0, and the pre-charge with the low voltage V1 is performed from the time t0 to a time t1. It is preferable that the pre-charge period is determined in advance.

At the time t1, the applied voltage to the drive coil 31 is switched from the low voltage V1 to the high voltage V2. Thus, the coil current is steeply increased in the boost period from the time t1 to the time t2 rather than a period from the time t0 to the time t1. Then, when the coil current reaches a predetermined target peak value Ip at the time t2, the application of the high voltage V2 is terminated. At the time or immediately before the time when the coil current reaches the target peak value Ip, the needle lift is started and a fuel injection is also started. It is determined whether the coil current reaches the target peak value Ip based on the detected current value detected by the electric current sensor 61. That is, in the boost period (t1-t2), the drive IC 36 determines whether the detected current becomes greater than or equal to the target peak value Ip. When the detected current becomes greater than or equal to the target peak value Ip, the coil voltage is changed (application of voltage V2 is terminated).

After the time t2, since the application of voltage V2 is terminated, the coil current is decreased. However, the low voltage V1 is intermittently applied to the drive coil 31 based on a predetermined current threshold and the detected current detected by the electric current sensor 61. In FIG. 8, the current threshold is defined by two steps while the low voltage V1 is applied. When the coil current (detected current) becomes lower than the threshold, the low voltage V1 is applied. The switch of the current threshold (switch from high to low) may be conducted at a time when the needle lift amount is estimated to be a specified partial lift amount (time t3).

When the injection pulse is turned off at a time t4, the voltage application to the drive coil 31 is terminated so that the coil current becomes zero. The needle lift also becomes zero and the fuel injection is terminated.

When the fuel injection valve 21 is driven to be opened, the applied voltage is switched according to the detected coil current, as described above. However, the detected coil current may include errors due to various factors of the electric current sensor 61. For example, it is considered that the detection errors are generated due to individual differences or aged deterioration of the electric current sensor 61. If the detected current includes errors relative to the actual coil current (actual current), a timing at which the coil current reaches the target peak value Ip cannot be appropriately obtained, which may cause shortage or overage of the fuel injection quantity.

Figure 6:
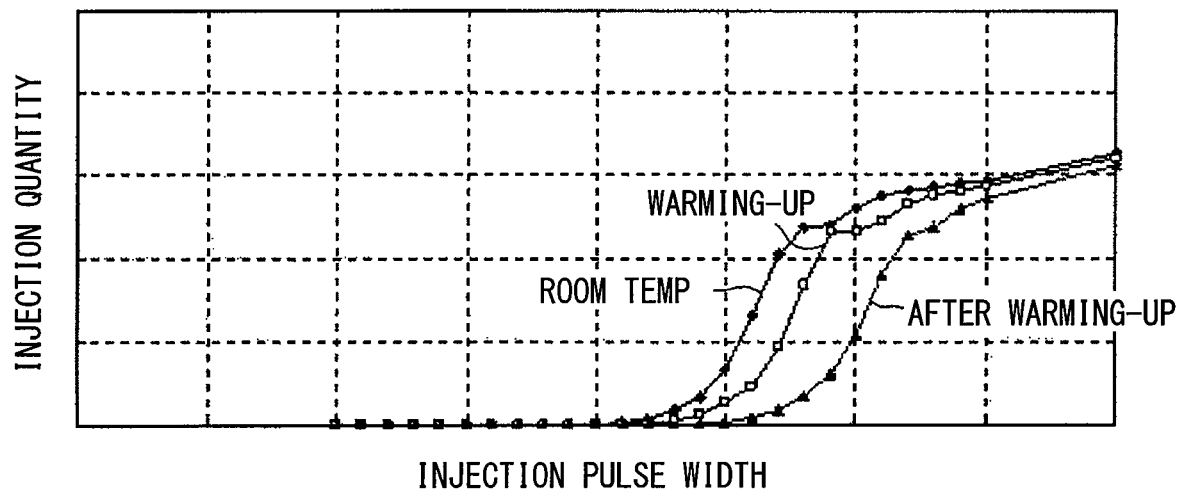
FIG. 6 is a chart showing a relationship between an injection pulse width of a fuel injection valve, an actual injection quantity of the fuel injection valve, and a warm-up condition.

FIG. 6 is a chart showing a relationship between the injection pulse width of the fuel injection valve 21, an actual injection quantity of the fuel injection valve, and a warm-up condition. As shown in FIG. 6, when the engine 11 is in room temperature before warming-up, the temperature of the drive coil 31 is low and an electric resistance is also low. Thus, the driving electricity flowing through the drive coil 31 becomes large, and the fuel injection quantity is increased early with respect to a specified injection pulse width. Along with a transition of the engine condition from the warming-up condition to the after warming-up condition, the fuel injection quantity is increased slowly. After the fuel injection valve 21 is fully lifted, a difference in fuel injection quantity becomes small with respect to the warming-up condition of the engine.

Figure 7:
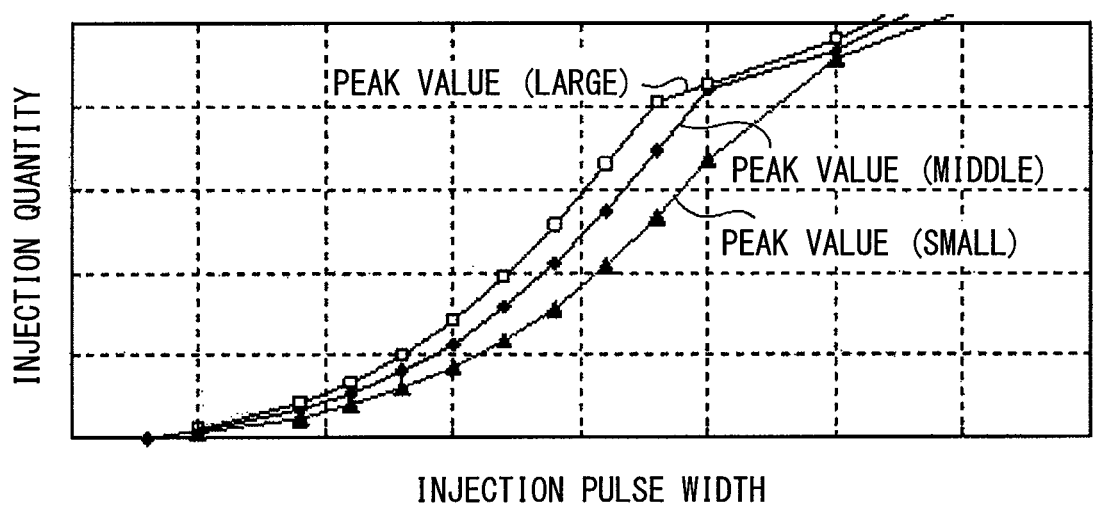
FIG. 7 is a chart showing a relationship between an injection pulse width of a fuel injection valve, an actual injection quantity of the fuel injection valve, and a peak value of a driving current.

FIG. 7 is a chart showing a relationship between the injection pulse width of the fuel injection valve 21, the actual injection quantity of the fuel injection valve, and the peak value of the driving current. The fuel injection quantity is varied according to a variation in peak value of the driving current, due to a manufacturing variation of the drive coil 31 of the fuel injection valve 21 and a variation in applied voltage. As shown in FIG. 7, as the peak value of the driving current is larger, the fuel injection quantity is earlier increased with respect to the injection pulse width. After the fuel injection valve 21 is fully lifted, a difference in fuel injection quantity becomes small with respect to the peak value of the driving current.

When the detection error of the driving current or a variation of the driving current is occurred, the fuel injection quantity disperses. Such a disperse of the fuel injection quantity with the detection error of the driving current will be described in detail.

In a case that the ECU 30 does not correctly obtain a timing at which the coil current reaches the target peak value IP, a coil current wave form, which is shown by broken lines D2, D3, deviates from a proper coil current wave form D1. When it is recognized that the coil current reaches the target peak value IP at a time "ta" which is earlier than a proper IP reach timing (time t2) as shown by the current wave form D2, the application of the high voltage V2 is terminated at early timing. This is caused when the detected current value deviates from the actual current value in a positive direction. Thus, a boost energy in the boost drive period is decreased and a needle lift operation becomes slow, which makes the fuel injection quantity short.

Moreover, when it is recognized that the coil current reaches the target peak value IP at a time "tb" which is later than the proper IP reach timing (time t2) as shown by the current wave form D3, the application of the high voltage V2 is terminated at late timing. This is caused when the detected current value deviates from the actual current value in a negative direction. Thus, the boost energy in the boost drive period becomes excessive and a needle lift operation becomes fast, which makes the fuel injection quantity excessive.

According to the present embodiment, a slope of variation in detected current is computed. Based on the computed slope, a correction processing is performed for correcting a deviation of a peak point of the actual current flowing through the fuel injection valve 21. Thus, in a case that the detection error of the coil current is generated, a deviation (shortage or overage) in supplied energy to the fuel injection valve 21 can be restricted.

Figure 11:
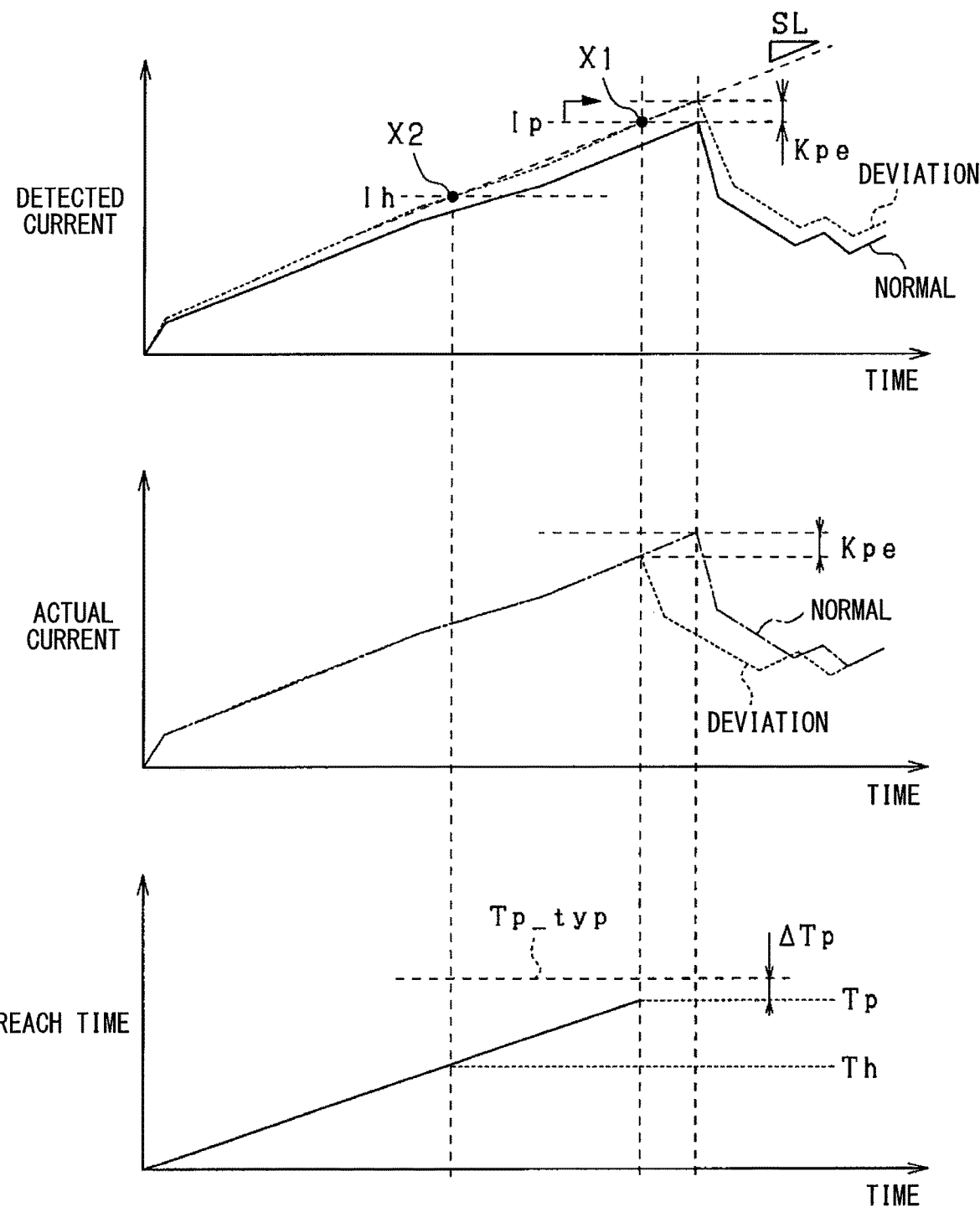
FIG. 11 is a time chart showing a peak current correction.
Figure 12:
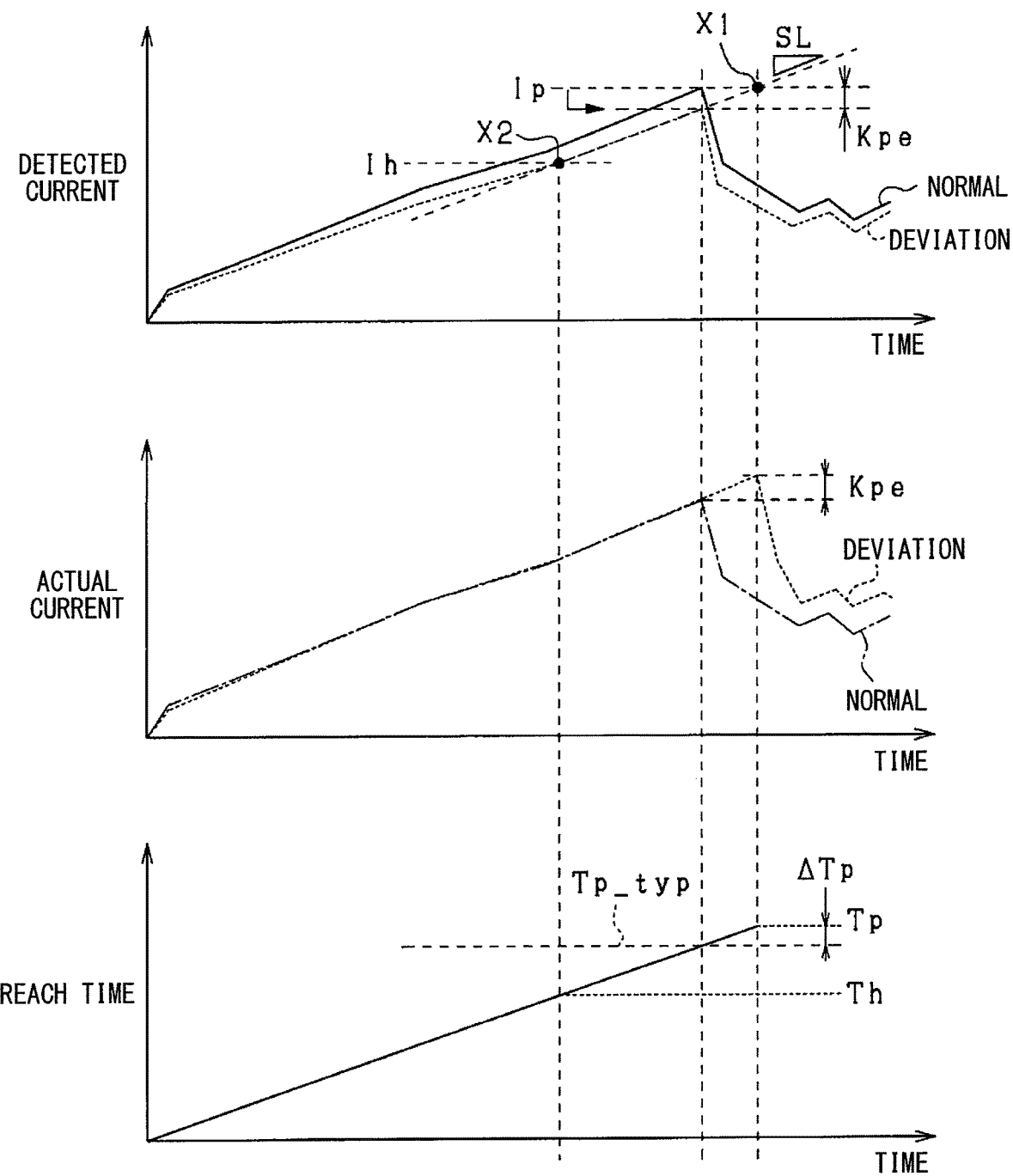
FIG. 12 is a time chart showing another peak current correction.

More specifically, as shown in FIGS. 11 and 12, in a condition where the high voltage V2 is applied to the fuel injection valve 21, a point (X1) at which the detected current reaches the target peak value Ip and a point (X2) at which the detected current reaches an intermediate value Ih which is smaller than the target peak value Ip are defined as current determination points. Based on the current values at each current determination point X1, X2 and a time interval between the points X1, X2, the current slope SL is computed. Moreover, based on the current slope SL, the target peak value Ip is corrected.

Regarding the configuration of the ECU 30, the microcomputer 35 transmits a predetermined target peak value Ip and an intermediated value Ih to the injector drive IC 36. Moreover, the injector drive IC 36 measures a peak current time Tp at which the detected current reaches the target peak value Ip in the boost drive period, and an intermediate current time Th at which the detected current reaches the intermediate value Th. The injector drive IC 36 transmits the peak current time Tp and the intermediate current time Th to the microcomputer 35. It should be noted that the reach times Tp, Th are measured as elapsed time after-injection pulse is turned on. The microcomputer 35 computes the current slope SL based on the target peak value Ip, the intermediated value Ih, and the reach times Tp, Th. Then, the microcomputer 35 computes a peak current correction value Kpe based on the current slope SL. Moreover, the microcomputer 35 corrects the target peak value Ip with the peak current correction value Kpe, and transmits a corrected target peak value Ipi to the injector drive IC 36.

(Peak Current Correction)

Figure 9:
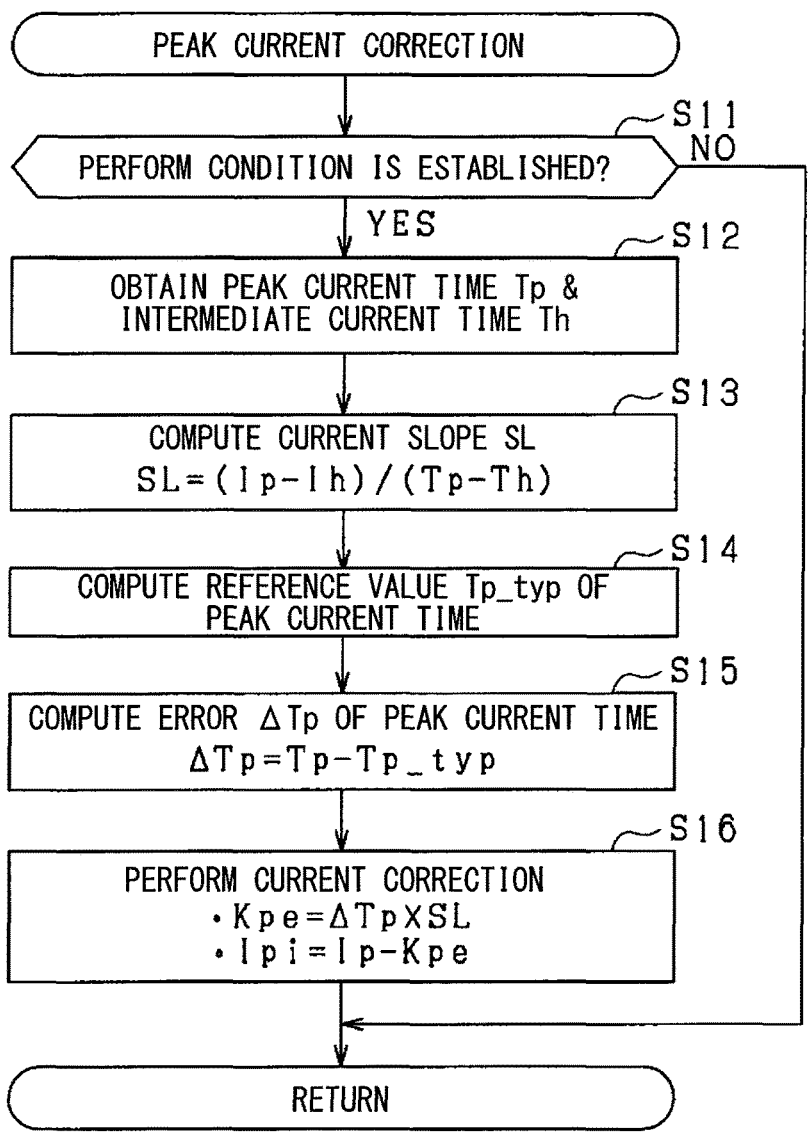
FIG. 9 is a flowchart showing a procedure of a peak current correction processing.

FIG. 9 is a flowchart showing a procedure of the peak current correction processing. This processing is repeatedly performed by the microcomputer 35 (which corresponds to a correction portion).

In S11 of FIG. 9, it is determined whether a perform condition for performing the peak current correction is established. When the peak current time Tp and the intermediate current time Th have been computed and when peak current correction has not been performed yet, it is determined that the perform condition is established. Moreover, the perform condition may include a condition where the engine driving condition is stable or a condition where a vehicle is not at idling state.

Then, in S12, the peak current time Tp and the intermediate current time Th are obtained. In S13, according to the following formula (1), a slope (current slope SL) of a variation of the detected coil current value is computed.

$$SL = (Ip - Ih)/(Tp - Th) \quad (1)$$

Figure 10:
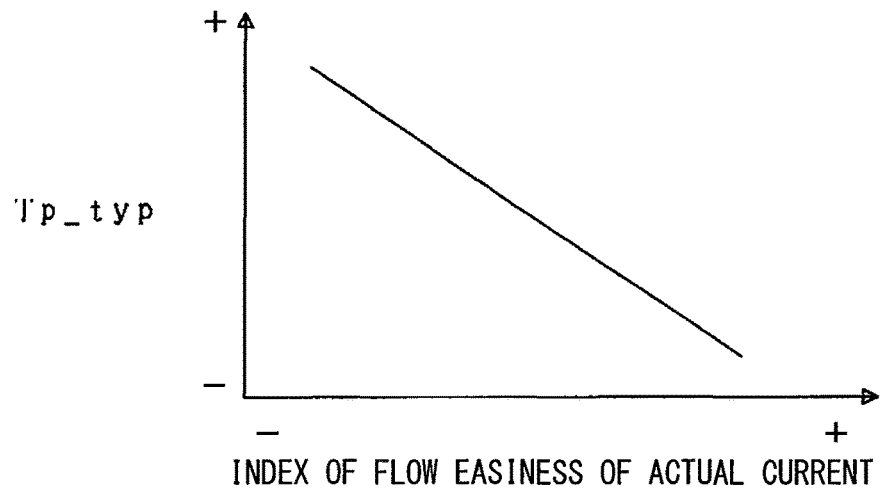
FIG. 10 is a chart showing a relationship between a current index of an actual current and a reference value.

Then, in S14, a reference value Tp_typ of the peak current time is computed. The reference value Tp_typ is computed based on a relationship shown in FIG. 10. FIG. 10 is a chart showing a relationship between the current index indicating a flow easiness of the actual current and the reference value Tp_typ. As the actual current flows more easily, the reference value Tp_typ is set to smaller value. The current index indicating a flow easiness of the actual current depends on the temperature of the fuel injection valve 21 (drive coil 31) and the applied voltage. A plurality of characteristic lines may be defined with respect to each of variation factors of the reference value Tp_typ.

Then, in S15, an error ΔTp of the peak current time is computed according to the following formula (2).

$$\Delta Tp = Tp - Tp\_typ \quad (2)$$

In S16, according to the following formulas (3), (4), the peak current correction value Kpe and the corrected target peak value Ipi are computed.

$$Kpe = \Delta Tp \times SL \quad (3)$$

$$Ipi = Ip - Kpe \quad (4)$$

The peak current correction value Kpe and the corrected target peak value Ipi computed in S16 may be stored in a back-up memory (nonvolatile memory) as learning values. The corrected target peak value Ipi is transmitted to the injector driving IC 36.

The above processing will be described referring to FIGS. 11 and 12. FIG. 11 shows an example in which the detected current detected by the current sensor 61 deviates in a positive direction. FIG. 12 shows an example in which the detected current detected by the current sensor 61 deviates in a negative direction. Regarding the detected current waveform, a solid line shows a waveform in normal condition, and a broken line shows a waveform in which a detection deviation is occurred. In FIGS. 11 and 12, a pre-charge period is omitted for simplifying an explanation.

The injector driving IC 36 measures the intermediate current time Th at which the detected current reaches the intermediated value Ih(X2) and the peak current time Tp at which the detected current reaches the target peak value Ip(X1). Then, the current slope SL is computed according to the above formula (1). Moreover, the error ΔTp of the peak current time is computed according to the above formula (2), and the peak current correction value Kpe is computed according to the above formula (3). The target peak value Ip is corrected to be increased by the peak current correction value Kpe.

By correcting the target peak value IP to be increased, a deviation of the actual current peak can be restricted. It is restricted that the fuel injection quantity becomes excessively small due to a deviation of the detected current relative to the actual current in a positive direction. That is, by correcting the target peak value Ip to be increased, a valve opening responsiveness of a needle lift is improved. Thereby, it can be restricted that the fuel injection quantity runs short.

In FIG. 12, the target peak value Ip is corrected to be decreased by the peak current correction value Kpe. By correcting the target peak value IP to be decreased, a deviation of the actual current peak can be restricted. It is restricted that the fuel injection quantity becomes excessively large due to a deviation of the detected current relative to the actual current in a negative direction. That is, by correcting the target peak value Ip to be decreased, a valve opening responsiveness of a needle lift is lowered. Thereby, it can be restricted that the fuel injection quantity becomes excessively large.

(Pre-Charge Correction)

According to the present embodiment, a processing in which a slope of increase in actual current is varied according to the current slope SL is conducted as a correction processing. Moreover, a slope error ΔSL is computed based on the current slope SL and a predetermined reference slope. A pre-charge correction is performed.

Figure 13:
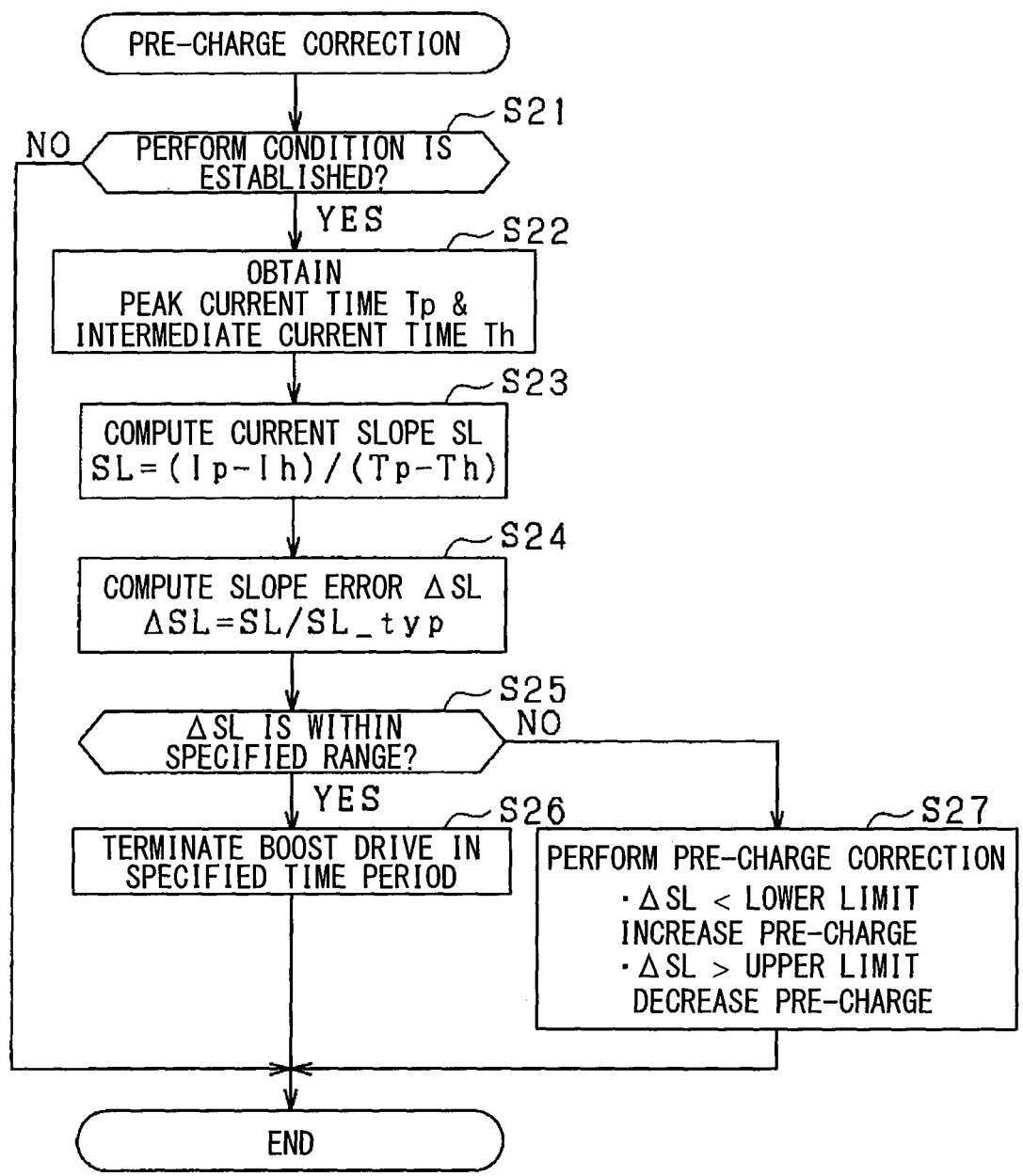
FIG. 13 is a flowchart showing a procedure of a pre-charge correction processing.

FIG. 13 is a flowchart showing a pre-charge correction processing. This processing is repeatedly performed by the microcomputer 35 (which corresponds to a correction portion).

In S21 of FIG. 13, it is determined whether a perform condition for performing the pre-charge correction is established. When the peak current time Tp and the intermediate current time Th have been computed and when the pre-charge correction has not been performed yet, it is determined that the perform condition is established. Moreover, the perform condition may include a condition where the engine driving condition is stable or a condition where a vehicle is not at idling state.

Then, in S22, the peak current time Tp and the intermediate current time Th are obtained. In S23, according to the above formula (1), the current slope SL is computed.

Then, in S24, the slope error ΔSL of the detected current is computed according to the following formula (5). SL_typ denotes a reference value of current slope SL.

$$\Delta SL = SL/SL\_typ \qquad (5)$$

The reference value SL_typ is computed based on the current index indicating a flow easiness of the actual current. As the actual current flows more easily, the reference value SL_typ is set larger.

In S25, it is determined whether the slope error ΔSL of the detected current is within a specified range which is defined for determining whether the slope is proper. When the slope error ΔSL is in the specified range, the procedure proceeds to S26. In S26, it is determined that the boost drive will be terminated in a specified time period. This procedure corresponds to a normal processing.

When the slope error ΔSL is not within the specified range, the procedure proceeds to S27. In S27, a pre-charge correction is performed. When the slope error ΔSL is out of the specified range and is less than or equal to a lower limit value, the pre-charge amount is increased so as to increase an input energy during the pre-charge period. When the slope error ΔSL is out of the specified range and is greater than an upper limit value, the pre-charge amount is decreased so as to decrease the input energy during the pre-charge period. The increase and the decrease in the pre-charge amount are implemented by increasing/decreasing the pre-charge current and/or extending/shortening the pre-charge period. When the pre-charge period is extended/shortened, the width of the injection pulse is varied.

The above processing will be described referring to FIG. 14. FIG. 14 shows a case in which the detected current detected by the current sensor 61 deviates in a negative direction. Regarding the detected current waveform, a solid line shows a waveform in normal condition, and a broken line shows a waveform in which a detection deviation is occurred.

As shown in FIG. 14(a), when the detected current is normal, the current slope SL is the reference value SL_typ. When the detected current has a deviation, the current slope SL is smaller than the reference value SL_typ. In such a case, a pre-charge correction is performed based on the slope error ΔSL (=SL/SL_typ). Thereby, as shown in FIG. 14 (b), the current slope SL agrees with the reference value SL_typ.

By performing the pre-charge correction, a deviation of the actual current peak can be restricted. It is restricted that the fuel injection quantity becomes excessively large due to a deviation of the detected current relative to the actual current in a negative direction.

When the input energy is varied, a slope of increasing actual current in the boost driving is also varied. By correcting the input energy in the pre-charge, the slope of the increasing actual current is adjusted. Thus, the accuracy of the fuel injection control can be improved.

(Valve Closing Timing Detection)

Figure 25:
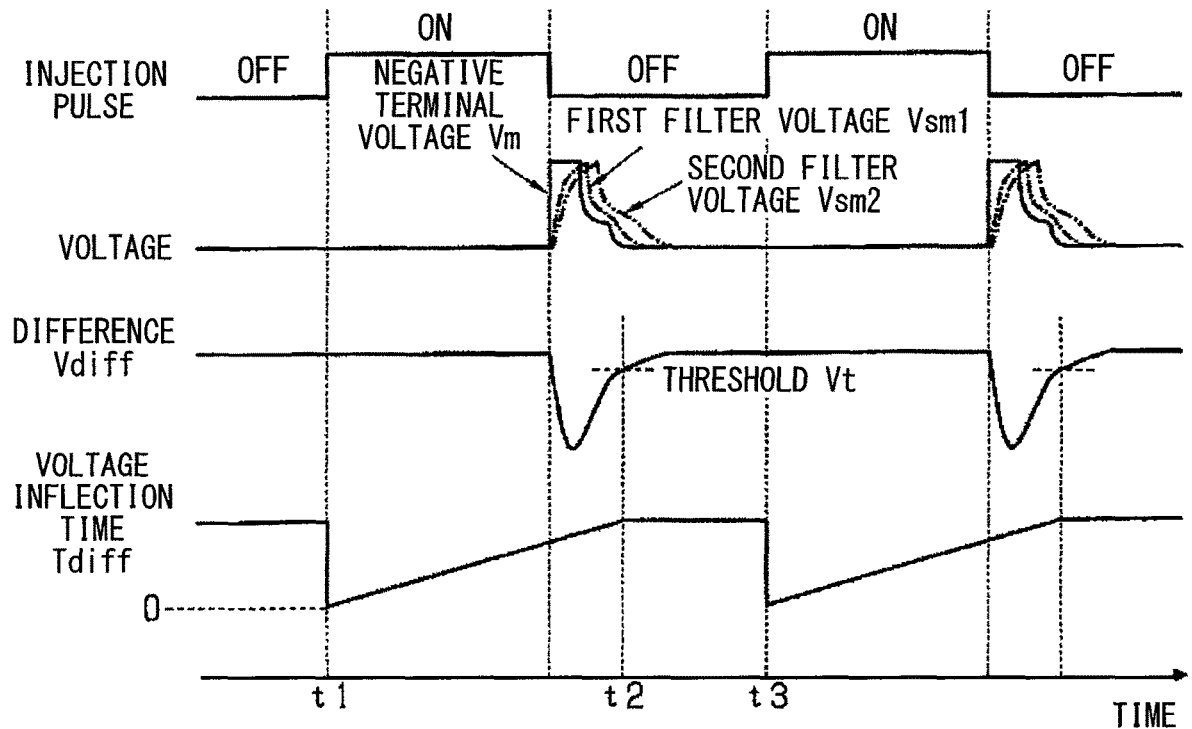
FIG. 25 is a time chart showing a voltage-inflection-time computation.

In the fuel injection valve 21, a negative terminal voltage detected by the voltage sensor 62 is varied by an induced electromotive force generated in the drive coil 31 after the injection pulse is turned off (refer to FIG. 25). When the fuel injection valve 21 is closed, the variation speed of the needle 33 (variation speed of the plunger 32) is varied relatively large and the variation characteristic of the negative terminal voltage is also varied. Thus, a voltage inflection point is generated at a valve closing timing or its vicinity.

Figure 21:
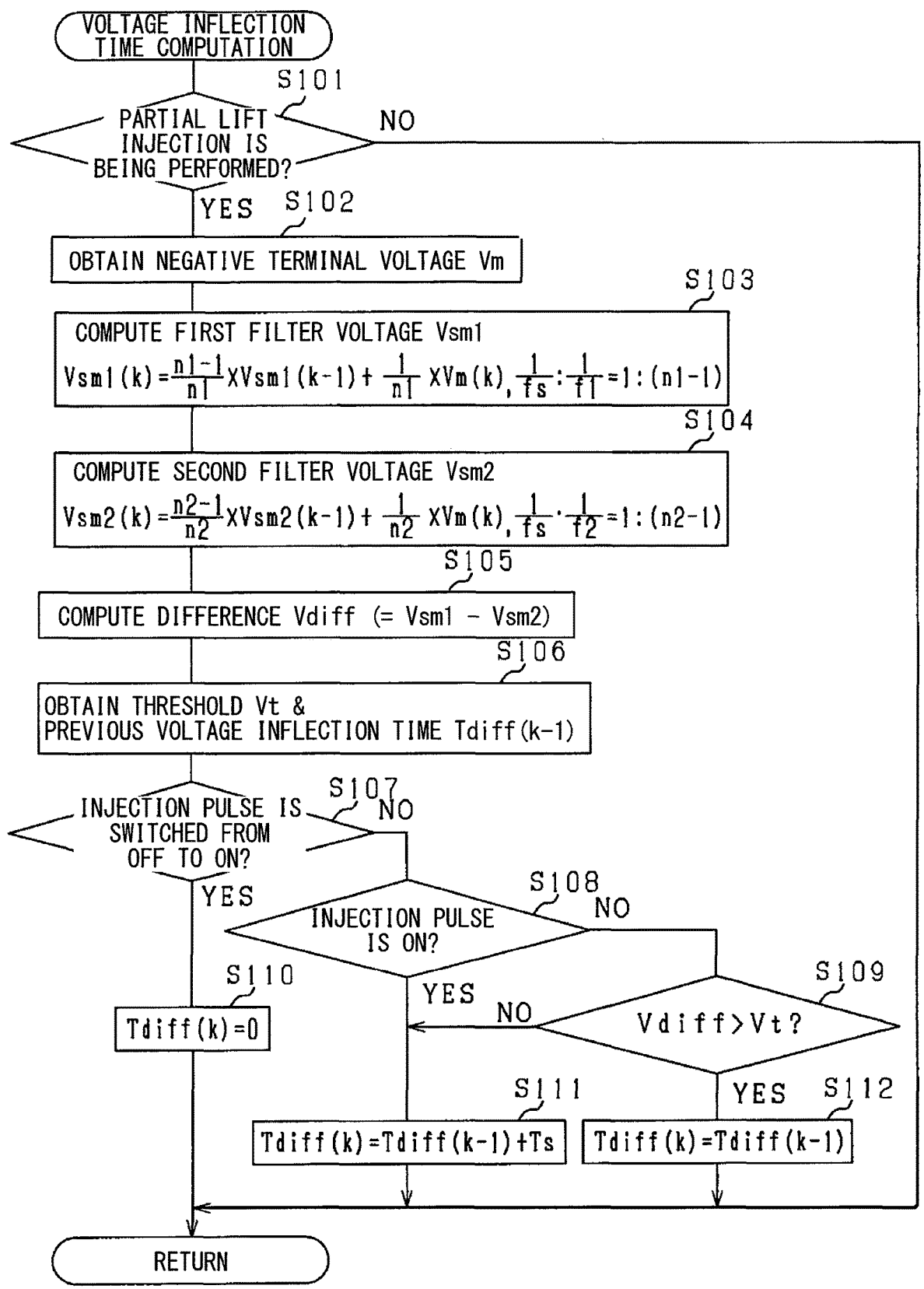
FIG. 21 is a flowchart showing a procedure of a voltage-inflection-time computation processing.

In view of the above characteristics, the ECU 30 (for example, the injector drive IC 36) performs a voltage inflection time computation routine shown in FIG. 21, whereby the voltage inflection time which is an information relating to a valve closing timing is computed.

The computing portion 37 of the drive IC 36 (refer to FIG. 2) computes a first filter voltage Vsm1 which is obtained by filtering the negative terminal voltage Vm with a first low-pass filter while a partial lift injection is performed (at least after the injection pulse of the partial lift injection is turned off). The first low-pass filter has a cut-off frequency which is a first frequency f1 lower than noise frequency. Further, the computing portion 37 computes a second filter voltage Vsm2 which is obtained by filtering the negative terminal voltage Vm with a second low-pass filter while the partial lift injection is performed (at least after the injection pulse of the partial lift injection is turned off). The second low-pass filter has a cut-off frequency which is a second frequency f2 lower than the first frequency f1. Thereby, the first filter voltage Vsm1 obtained by removing noise from the negative terminal voltage Vm and the second filter voltage Vsm2 for detecting the voltage inflection point can be computed.

Furthermore, the computing portion 37 of the drive IC 36 computes a difference Vdiff (=Vsm1−Vsm2) between the first filter voltage Vsm1 and the second filter voltage Vsm2, and performs a processing to compute a voltage inflection time Tdiff which is a time from a specified reference timing to the inflection point. According to the present embodiment, a timing at which the difference Vdiff exceeds a predetermined threshold Vt is computed as a timing at which the difference Vdiff becomes the inflection point so as to compute the voltage inflection time Tdiff. That is, a time period from the reference timing until the difference Vdiff exceeds the threshold Vt is computed as the voltage inflection time Tdiff. Thereby, the voltage inflection time Tdiff which varies according to the valve closing timing of the fuel injection valve 21 can be computed with high accuracy. According to the present embodiment, a timing at which the injection pulse of the partial lift injection is turned on from off is established as the reference timing to compute the voltage inflection time Tdiff. The threshold Vt is computed according to the fuel pressure and the fuel temperature by a threshold computing portion 38 (refer to FIG. 2) of the engine control microcomputer 35. Alternatively, the threshold Vt may be a predetermined fixed value.

Figure 15:
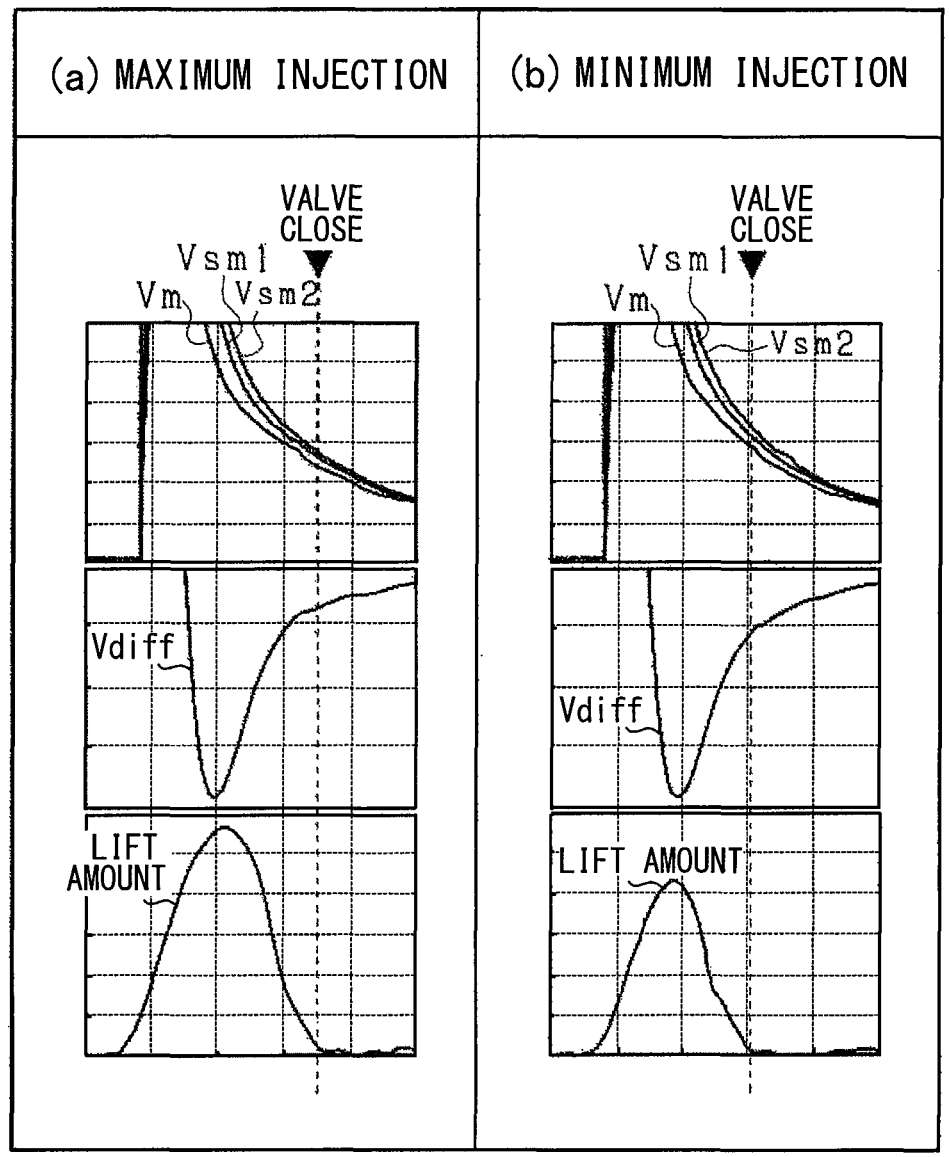
FIG. 15 is a chart showing a relationship between an injection quantity and a valve closing timing of a fuel injection valve.
Figure 16:
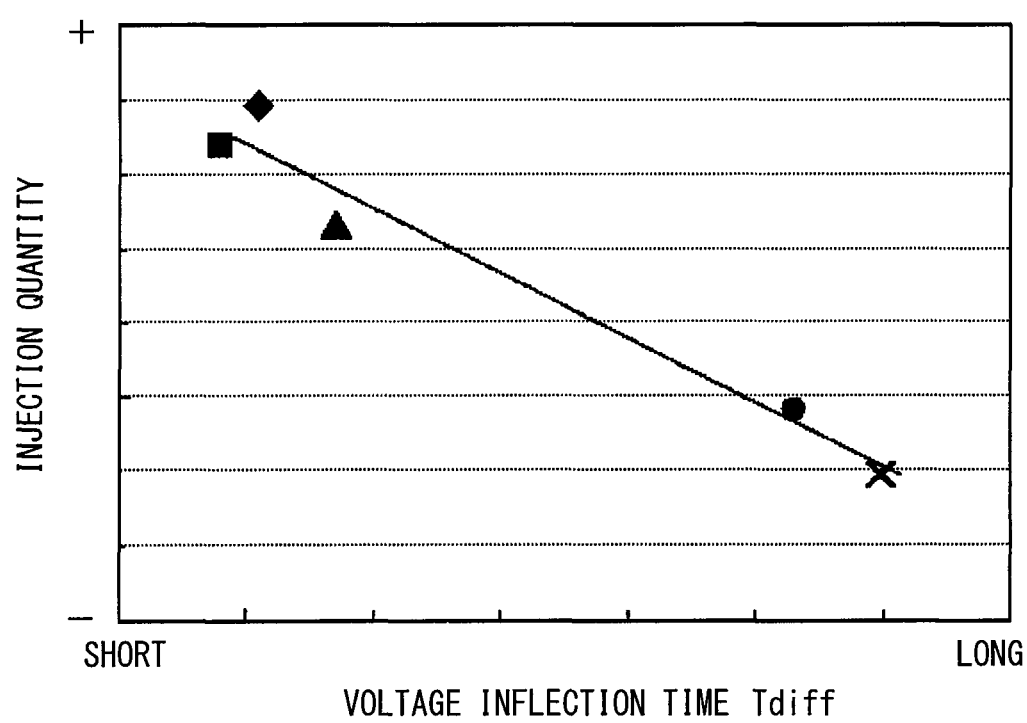
FIG. 16 is a chart showing a relationship between a voltage inflection time of a fuel injection valve and a fuel injection quantity.

As shown in FIG. 15, in a partial lift range of the fuel injection valve 21, the fuel injection quantity and the valve closing timing are varied according to a dispersion in lift amount of the fuel injection valve 21. Thus, the fuel injection quantity of the fuel injection valve 21 and the valve closing timing have a correlation with each other. Furthermore, since the voltage inflection time Tdiff is varied according to the valve closing timing of the fuel injection valve 21, the voltage inflection time Tdiff and the fuel injection quantity have a correlation with each other, as shown in FIG. 16.

Figure 22:
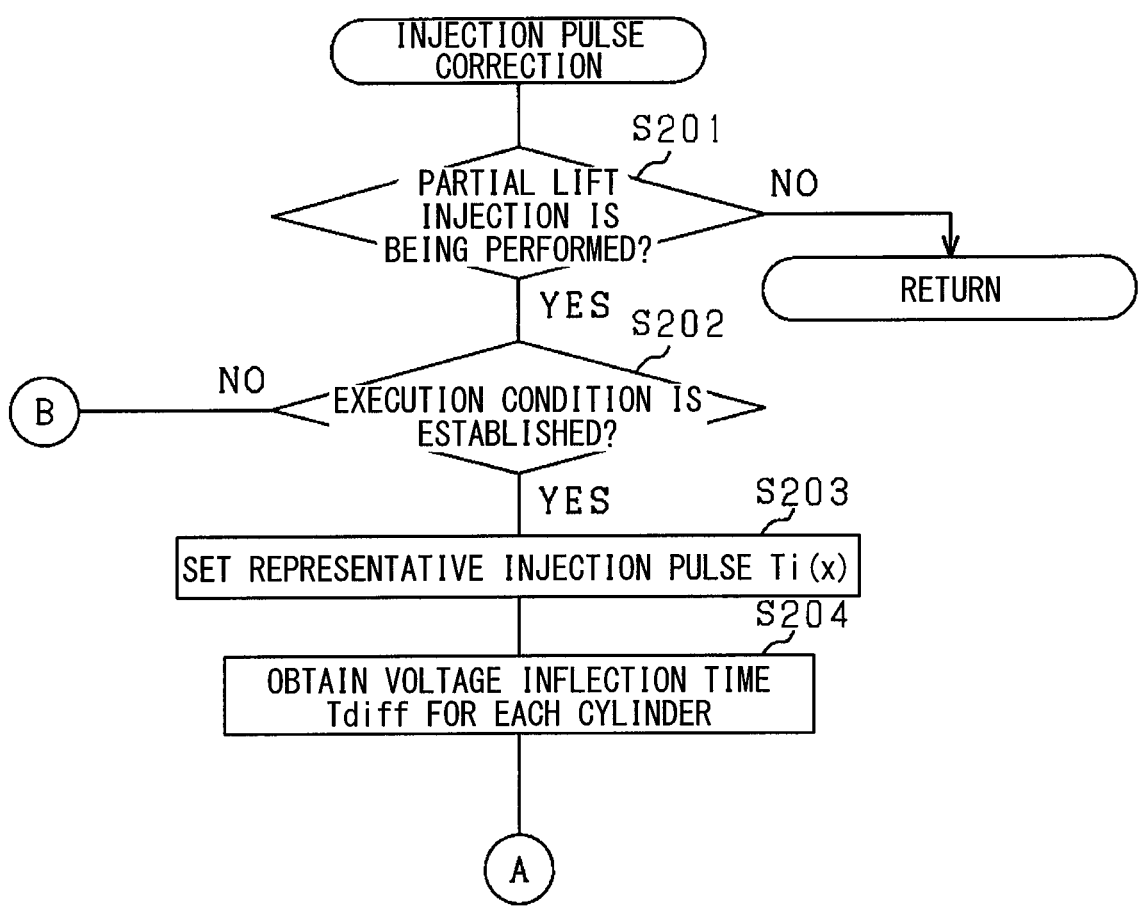
FIG. 22 is a flowchart showing a procedure of an injection pulse correction processing.
Figure 23:
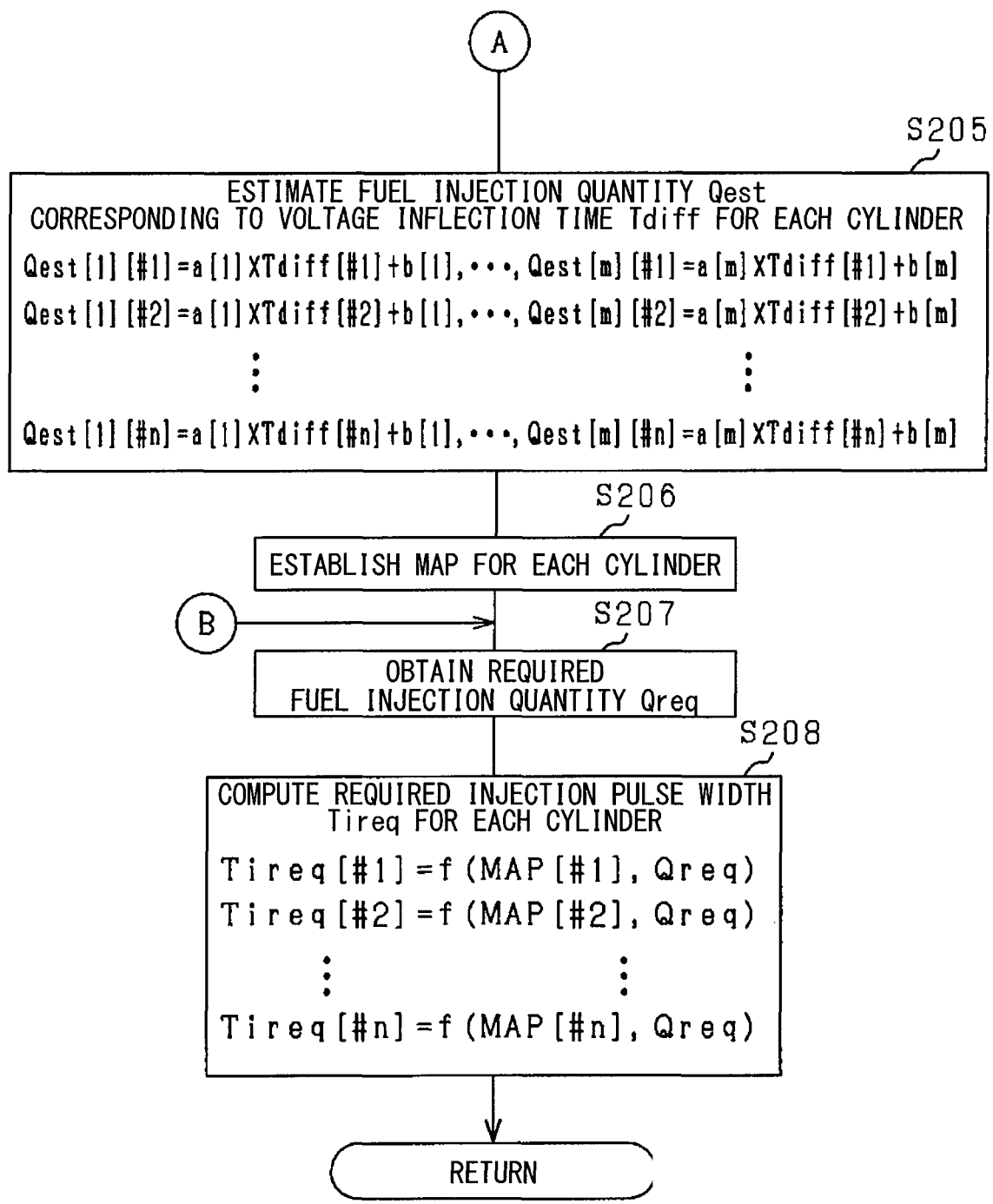
FIG. 23 is a flowchart showing a procedure of an injection pulse correction processing.

In view of the above relationship, the ECU 30 (for example, the engine control microcomputer 35) performs an injection pulse correction routine shown in FIGS. 22 and 23 so that the injection pulse of the partial lift injection is corrected based on the voltage inflection time Tdiff.

Figure 17:
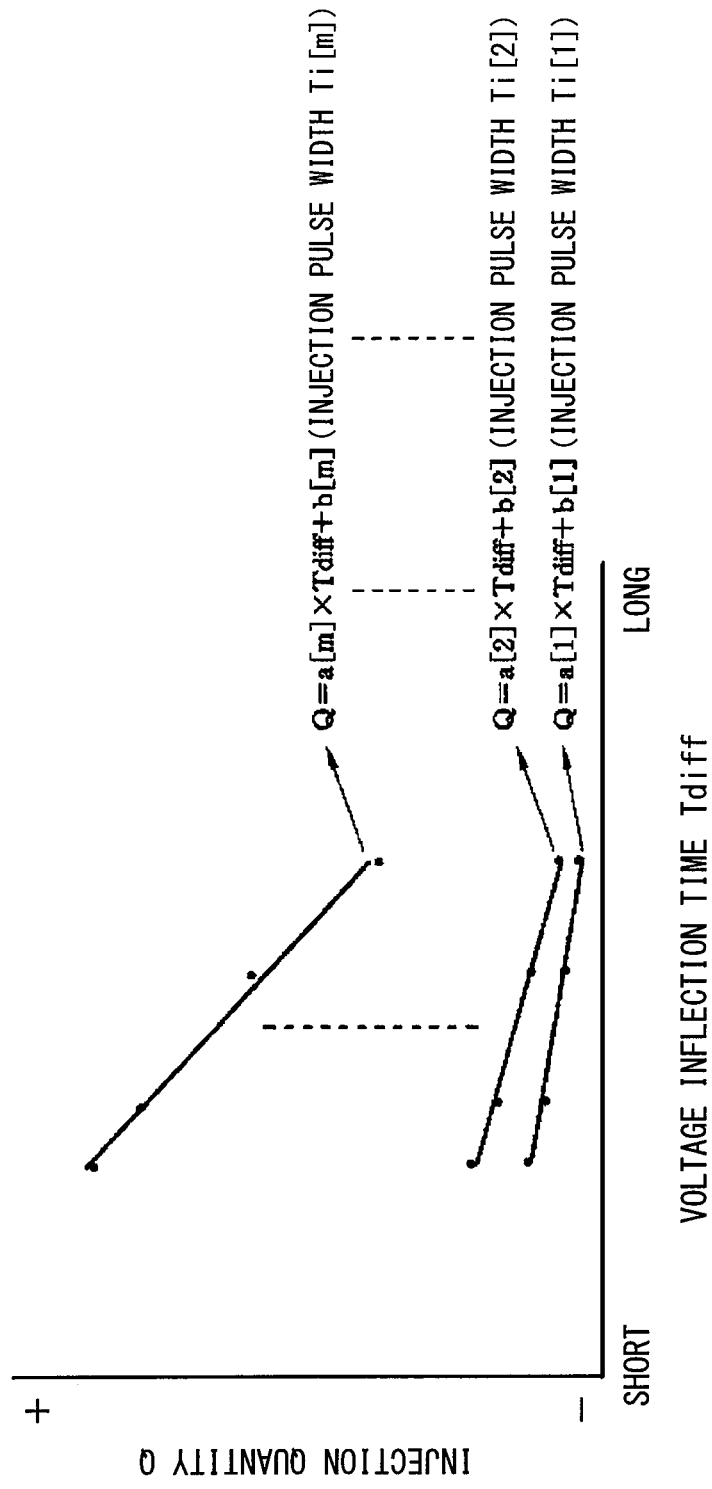
FIG. 17 is a chart showing a linear expression which approximates a relationship between a voltage inflection time and a fuel injection quantity.

The ECU 30 stores a relationship between the voltage inflection time Tdiff and the fuel injection quantity Q for each of injection pulses Ti in a ROM 42 (memory means). As the relationship between the voltage inflection time Tdiff and the fuel injection quantity Q, a linear expression "Q=a×Tdiff+b" is used, which approximates the relationship between the voltage inflection time Tdiff and the fuel injection quantity Q. In this case, as shown in FIG. 17, based on experimental data, the linear expression "Q=a×Tdiff+b" approximating the relationship between the voltage inflection time Tdiff and the fuel injection quantity Q is defined with respect to a plurality of injection pulse widths Ti[1]-Ti[m]. The slope "a" and the intercept "b" of the linear expression are stored with respect to each injection pulse width Ti.

Figure 18:
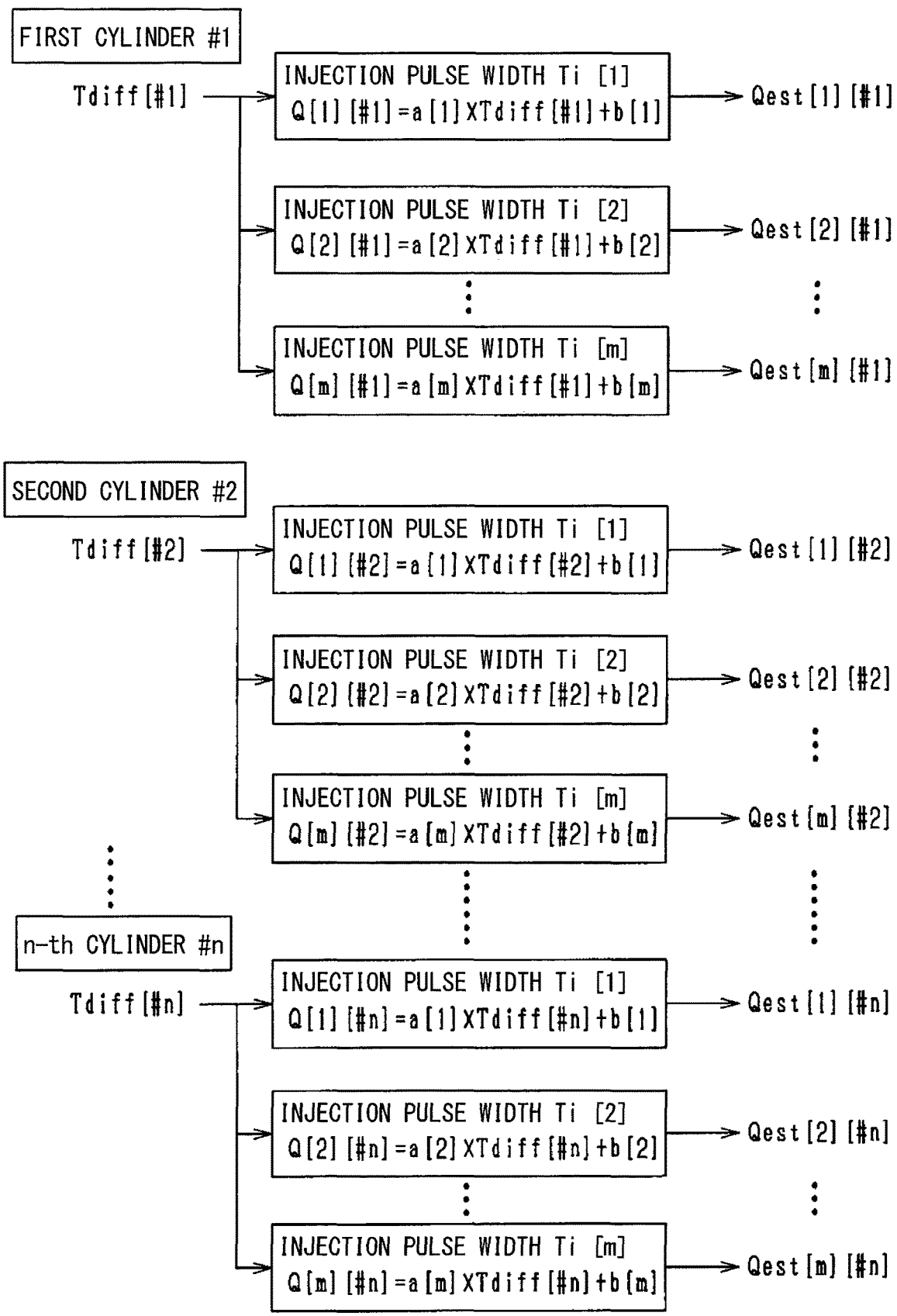
FIG. 18 is a chart showing a processing for estimating the fuel injection quantity corresponding to the voltage inflection time.

An injection pulse correction computing portion 39 of the engine control microcomputer 35 estimates the fuel injection quantity Qest corresponding to the voltage inflection time Tdiff which is computed by the injector drive IC 36 (computing portion 37) according to the relationship between the voltage inflection time Tdiff and the fuel injection quantity Q (the linear expression "Q=a×Tdiff+b") previously stored in the ROM 42 for each injection pulse width Ti. Specifically, as shown in FIG. 18, in a case of a n-cylinder engine 11, with respect to the first cylinder #1 to the n-th cylinder #n, the fuel injection quantity Qest corresponding to the voltage inflection time Tdiff is estimated (computed) for each injection pulse width Ti according to the linear expression "Q=a×Tdiff+b" which is stored for each injection pulse width Ti[1]-Ti[m]. Thereby, the fuel injection quantity Qest corresponding to the current voltage inflection time Tdiff (that is, the voltage inflection time Tdiff reflecting the current injection characteristics of the fuel injection valve 21) can be estimated for each injection pulse width Ti.

Figure 19:
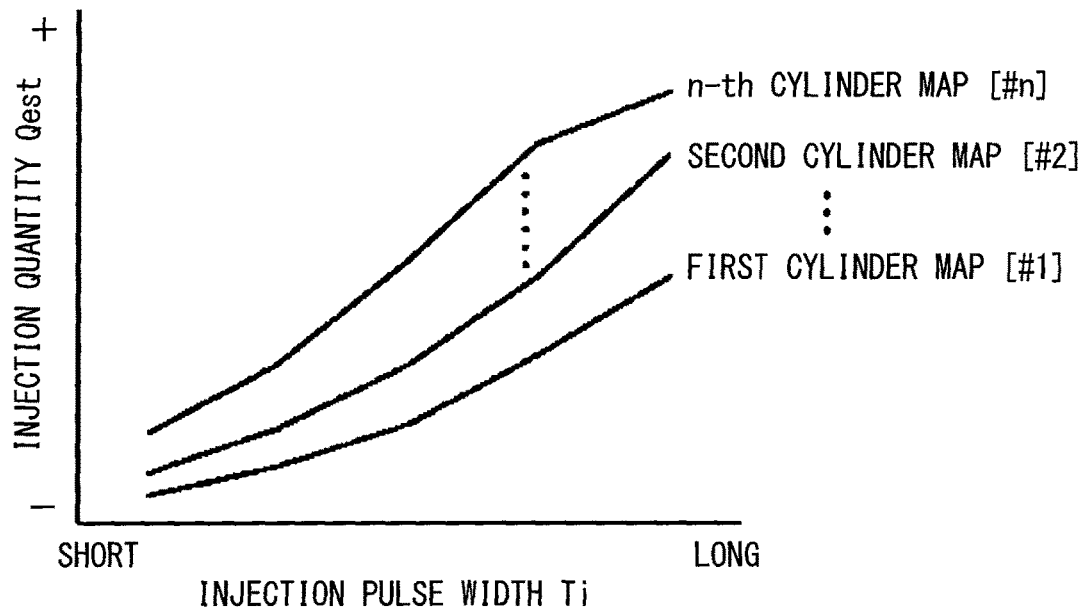
FIG. 19 is a chart showing a map which defines a relationship between an injection pulse width and a fuel injection quantity.

Furthermore, based on the estimated result (estimated result of the fuel injection quantity Qest corresponding to the voltage inflection time Tdiff for each injection pulse width Ti), the relationship between the injection pulse width Ti and the fuel injection quantity Qest is established to each cylinder of the engine 11. Specifically, as shown in FIG. 19, in case of n-cylinder engine 11, a map defining a relationship between the injection pulse width Ti and the fuel injection quantity Qest is established with respect to the first cylinder #1 to the n-th cylinder #n. Thereby, the relationship between the injection pulse width Ti and the fuel injection quantity Qest, which corresponds to the current injection characteristic of the fuel injection valve 21, can be established, and the relationship between the injection pulse width Ti and the fuel injection quantity Qest can be corrected.

Figure 20:
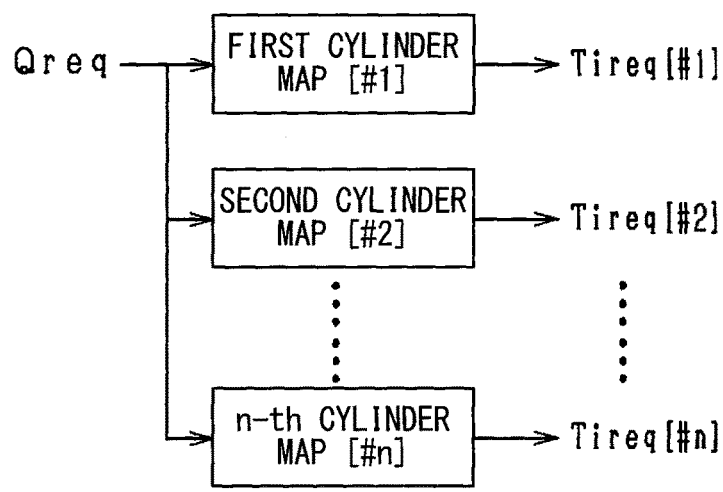
FIG. 20 is a chart showing a processing for computing a required injection pulse width corresponding to a required fuel injection quantity.

Then, a required injection pulse width Tireq corresponding to the required injection quantity Qreq is computed for each cylinder of the engine 11 by use of a map which defines the relationship between the injection pulse width Ti and the fuel injection quantity Qest. Specifically, as shown in FIG. 20, in case of n-cylinder engine 11, the required injection pulse width Tireq corresponding to the required fuel injection quantity Qreq is computed based on a map for each cylinder (map defining the relationship between the injection pulse width Ti and the fuel injection quantity Qest) with respect to the first cylinder #1 to the n-th cylinder #n. Thereby, the required injection pulse width Tireq for obtaining the required fuel injection quantity Qreq in the current injection characteristic of the fuel injection valve 21 can be established with high accuracy.

Hereinafter, a voltage inflection time computation routine shown in FIG. 21 and an injection pulse correction routine shown in FIGS. 22 and 23, which are performed by the ECU 30 (the engine control microcomputer 35 and/or the injector driving IC 36), will be described.

(Voltage Inflection Time Computation)

A voltage inflection time computation routine shown in FIG. 21 is repeatedly performed at a computation interval Ts by the ECU 30 (which corresponds to a valve close detecting portion) in a condition where an electric power supply from the injector drive IC 36 to the fuel injection valve 21 is corrected as above while the catalyst 25 is being warmed up. That is, in the catalyst warming-up control, a pilot-injection by the fuel injection valve 21 is performed in an intake stroke, and an after-injection by the fuel injection valve 21 is performed in a compression stroke. The full lift injection is performed as the pilot-injection, and the partial lift injection is performed as the after-injection.

In S101, it is determined whether the partial lift injection is being performed. When it is determined that the partial lift injection is not being performed, the routine is terminated without performing successive steps.

Meanwhile, when it is determined that the partial lift injection is being performed in S101, the procedure proceeds to S102 in which the negative terminal voltage Vm of the fuel injection valve 21 is obtained based on the detected value of the voltage sensor 62. The computation interval Ts corresponds to a sampling interval Ts of the negative terminal voltage Vm. In this case, the operation period Ts of this routine turns into the sampling period Ts of the negative terminal voltage Vm.

Then, the procedure proceeds to S103 in which the first filter voltage Vsm1 is computed by filtering the negative terminal voltage Vm of the fuel injection valve 21 with the first low-pass filter of which cut-off frequency is a first frequency f1 lower than a noise frequency (low-pass filter of which pass-band is lower than the cutoff frequency f1).

The first low-pass filter is a digital filter which is expressed by the following formula (6) for obtaining a current value Vsm1($k$) of the first filter voltage by use of the previous first filter voltage Vsm1($k$−1) and a current value Vm(k) of the negative terminal voltage.

$$Vsm1(k)=\{(n1-1)/n1\} \times Vsm1(k-1)+(1/n1) \times Vm(k) \quad (6)$$

A time constant n1 of the first low-pass filter is established in such a manner as to satisfy the following formula (7) which uses a sampling frequency fs (=1/Ts) of the negative terminal voltage Vm and the cut-off frequency f1 of the first low-pass filter.

$$1/fs:1/f1=1:(n1-1) \quad (7)$$

Thereby, the first filter voltage Vsm1 can be easily computed, which is filtered by the first low-pass filter of which cut-off frequency is the first frequency f1 lower than the noise frequency. Then, the procedure proceeds to S104 in which The second filter voltage Vsm2 is computed by filtering the negative terminal voltage Vm of the fuel injection valve 21 with the second low-pass filter of which cut-off frequency is a second frequency f2 lower than the first frequency f1 (low-pass filter of which pass-band is lower than the cutoff frequency f2).

The second low-pass filter is a digital filter which is expressed by the following formula (8) for obtaining a current value Vsm2($k$) of the second filter voltage by use of the previous second voltage Vsm2($k$−1) and a current value Vm(k) of the negative terminal voltage.

$$Vsm2(k)=\{(n2-1)/n2\} \times Vsm2(k-1)+(1/n2) \times Vm(k) \quad (8)$$

A time constant n2 of the second low-pass filter is established in such a manner as to satisfy the following formula (9) which uses a sampling frequency fs (=1/Ts) of the negative terminal voltage Vm and the cut-off frequency f2 of the second low-pass filter.

$$1/fs:1/f2=1:(n2-1) \quad (9)$$

Thereby, the second filter voltage Vsm2 can be easily computed, which is filtered by the second low-pass filter of which cut-off frequency is the second frequency f2 lower than the first frequency f1.

Then, the procedure proceeds to S105 in which the difference Vdiff (=Vsm1−Vsm2) between the first filter voltage Vsm1 and the second filter voltage Vsm2 is computed. A guard process may be performed in order that the difference Vdiff does not exceed "0" to extract negative components.

Then, the procedure proceeds to S106 in which the threshold Vt and a previous value Tdiff(k−1) of the voltage inflection time are obtained.

Then, the procedure proceeds to S107 in which it is determined whether it is a timing at which the injection pulse is switched from off to on. When it is determined that it is a timing at which the injection pulse is switched from off to on in S107, the procedure proceeds to S110 in which the current value Tdiff(k) of the voltage inflection time is reset to "0".

$$T\text{diff}(k)=0$$

When it is determined that it is not a timing at which the injection pulse is switched from off to on in S107, the procedure proceeds to S108 in which it is determined whether the injection pulse is on. When it is determined that the injection pulse is on, the procedure proceeds to S111 in which a specified value Ts (computation interval) is added to the previous value Tdiff(k−1) of the voltage inflection time to obtain the current value Tdiff(k) of the voltage inflection time, so that the voltage inflection time Tdiff is updated.

$$T\text{diff}(k)=T\text{diff}(k-1)+Ts$$

When it is determined that the injection pulse is not on (that is, the injection pulse is off) in S108, the procedure proceeds to S109 in which it is determined whether the difference Vdiff between the first filter voltage Vsm1 and the second filter voltage Vsm2 exceeds the threshold Vt.

When it is determined that the difference Vdiff between the first filter voltage Vsm1 and the second filter voltage Vsm2 does not exceed the threshold Vt in S109, the procedure proceeds to S111 in which the voltage inflection time Tdiff is updated.

When it is determined that the difference Vdiff between the first filter voltage Vsm1 and the second filter voltage Vsm2 exceeds the threshold Vt in S109, it is determined that the computation of the voltage inflection time Tdiff has been completed, and the procedure proceeds to S112 in which the current value Tdiff(k) of the voltage inflection time is held at the previous value Tdiff(k−1).

$$T\text{diff}(k)=T\text{diff}(k-1)$$

Thereby, the voltage inflection time Tdiff is computed as a time from when the injection pulse is switched from off to on until when the difference Vdiff exceeds the threshold Vt. The computed voltage inflection time Tdiff is kept until a next reference timing. The voltage inflection time Tdiff is computed for each cylinder of the engine 11. A timing at which the difference Vdiff exceeds the threshold Vt corresponds to the valve closing timing of the fuel injection valve 21.

[Injection Pulse Correction Routine]

An injection pulse correction routine shown in FIGS. 22 and 23 is repeatedly performed at a specified interval while the ECU 30 (computing portion) is energized (for example, a period during which the ignition switch is on). In S201, it is determined whether the partial lift injection is being performed. When it is determined that the partial lift injection is not being performed in S201, the routine is terminated without performing successive steps.

When it is determined that the partial lift injection is being performed in S201, the procedure proceeds to S202 in which it is determined whether a specified execution condition is established based on whether the injection pulse Ti can be established as a representative injection pulse Ti(x).

When it is determined that the execution condition is established in S202, the procedure proceeds to S203 in which the injection pulse width Ti is set to the representative injection pulse Ti(x) for the partial lift injection.

Figure 24:
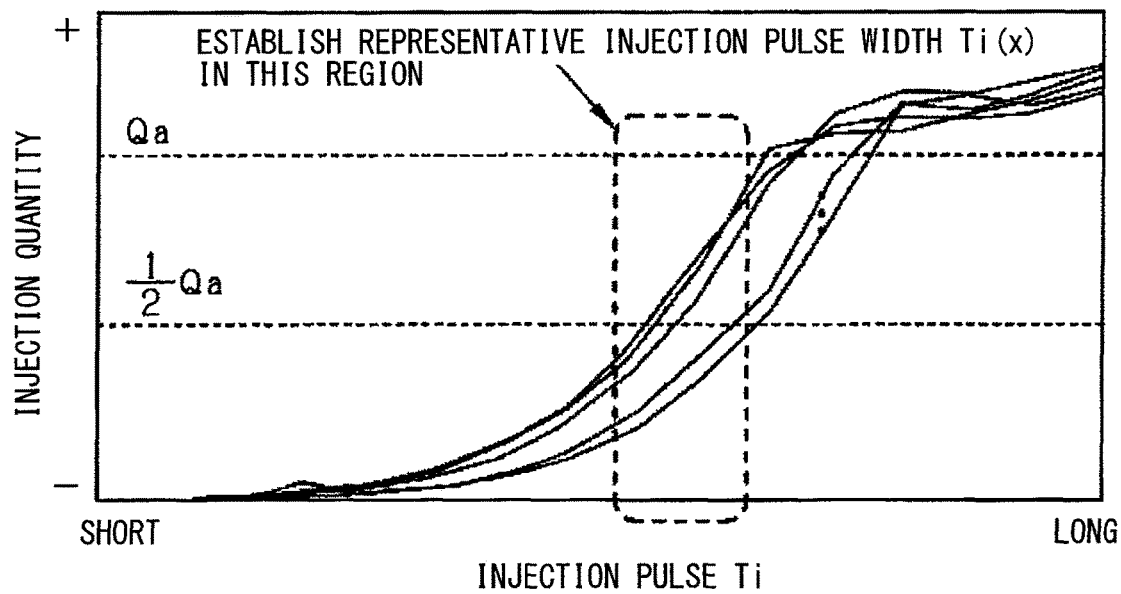
FIG. 24 is a chart showing a representative injection pulse width.

As shown in FIG. 24, an injection quantity Qa corresponds to a boundary between the partial lift injection and the full lift injection. When the fuel injection pulse Ti corresponds to about ½ Qa (a region denoted by a broken line in FIG. 24), a disperse of the fuel injection quantity is largest. In view of this characteristic, the representative injection pulse width Ti(x) is established in such a manner that the fuel injection quantity is a half of the fuel injection quantity Qa which corresponds to the boundary between the partial lift injection and the full lift injection.

Then, the procedure proceeds to S204 in which voltage inflection time Tdiff is obtained for each cylinder (the first cylinder #1 to the n-th cylinder #n), which is computed according to the routine shown in FIG. 21. That is, when the partial lift injection is performed with the representative injection pulse width Ti(x), the voltage inflection time Tdiff computed by the injector drive IC 36 (computing portion 37) is obtained for each cylinder.

Then, the procedure proceeds to S205 in FIG. 23. With respect to each cylinder (the first cylinder #1 to the n-th cylinder #n), the fuel injection quantity Qest corresponding to the voltage inflection time Tdiff is estimated (computed) for each injection pulse width Ti according to the linear expression "Q=a×Tdiff+b" which is stored for each injection pulse width Ti[1]-Ti[m] (refer to FIG. 18).

Then, the procedure proceeds to S206 in which a map (refer to FIG. 19) defining a relationship between the injection pulse width Ti and the fuel injection quantity Qest for each cylinder (the first cylinder #1 to the n-th cylinder #n) is established based on the estimation result in S205. Then, the map defining the relationship between the injection pulse width Ti and the fuel injection quantity Qest is corrected (updated).

Then, the procedure proceeds to S207 in which the required fuel injection quantity Qreq is obtained. In S208, the required injection pulse width Tireq corresponding to the required fuel injection quantity Qreq is computed based on a map for each cylinder (map defining the relationship between the injection pulse width Ti and the fuel injection quantity Qest) with respect to each cylinder (the first cylinder #1 to the n-th cylinder #n) (refer to FIG. 20).

When it is determined that the execution condition is not established in S202, the procedure proceeds to S207 in which the required injection pulse width Tireq corresponding to the required fuel injection quantity Qreq is computed by use of the corrected (updated) map (S207, 208).

Referring to a time chart shown in FIG. 25, a voltage inflection time computation will be described, hereinafter.

While the partial lift injection is performed (at least after the injection pulse of the partial lift injection is turned off), the first filter voltage Vsm1 obtained by filtering the negative terminal voltage Vm with the first low-pass filter and the second filter voltage Vsm2 obtained by filtering the negative terminal voltage Vm with the second low-pass filter are computed. Furthermore, the difference Vdiff (=Vsm1−Vsm2) between the first filter voltage Vsm1 and the second filter voltage Vsm2 is computed.

When the injection pulse is switched from off to on at the time t1 (reference time), the voltage inflection time Tdiff is reset to "0" and the computation of the voltage inflection time Tdiff is started. The voltage inflection time Tdiff is counted up at a specified computation interval Ts.

When the difference Vdiff between the first filter voltage Vsm1 and the second filter voltage Vsm2 exceeds the threshold Vt at the time t2, the computation of the voltage inflection time Tdiff is terminated. That is, a time period from when the injection pulse is switched from off to on at a time t1 (reference time) until when the difference Vdiff exceeds the threshold Vt at the time t2 is computed as the voltage inflection time Tdiff.

The computed value of the voltage inflection time Tdiff is held until the next reference time t3. In this period (from the time t2 until the time t3), the engine control microcomputer 35 obtains the voltage inflection time Tdiff from the injector drive IC 36.

Figure 26:
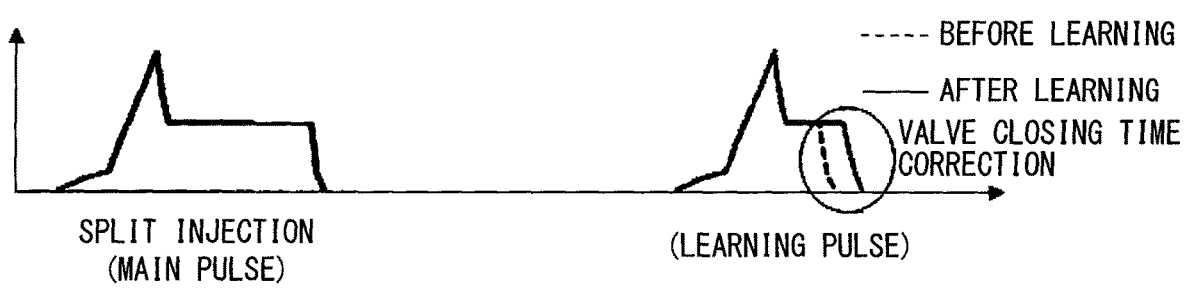
FIG. 26 is a time chart showing a pulse correction based on a detection of a valve closing timing.

The required injection pulse width Tireq (that is, the electric power supplied from the injection drive IC 36) is computed based on the time t2 at which the detected difference Vdiff exceeds the threshold Vt (the valve closing time) and the required fuel injection quantity Qreq. Accordingly, as shown in FIG. 26, a learning pulse is corrected from a broken line to a solid line.

Figure 27:
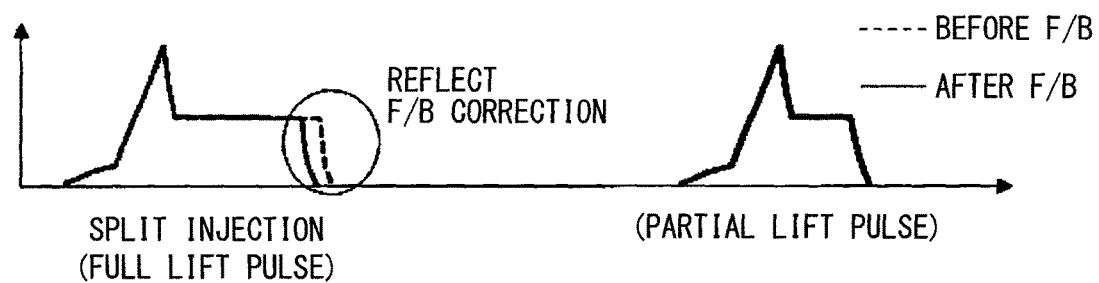
FIG. 27 is a time chart showing an air-fuel-ratio F/B correction.

According to the present embodiment, the ECU 30 performs an air-fuel ratio feedback control in which the air-fuel ratio is controlled to a target air-fuel ratio (for example, the stoichiometric air-fuel ratio). As shown in FIG. 27, the pulse width of the partial lift injection is the pulse width which is learned as shown in FIG. 26, and the pulse width of the full lift injection is corrected from a broken line to a solid line. Thereby, the air-fuel ratio can be controlled to the target air-fuel ratio.

According to the above embodiment, following advantages can be obtained.

In a case that the detected current of the current sensor 61 includes an error, a deviation is generated in a peak point of the actual current flowing through the fuel injection valve 21 when a high voltage is applied to the fuel injection valve 21. In this case, since a deviation is generated in the input energy of the fuel injection valve 21, a valve opening responsiveness (valve opening speed) may be varied and a shortage or overage of the fuel injection quantity may occur. According to the present embodiment, under a condition where the high voltage is applied to the fuel injection valve 21, the slope of variation in detected current is computed and the correction processing is performed for correcting the deviation of the peak point of the actual current based on the computed slope. Thereby, even when the detected current includes an error, a deviation of the input energy of the fuel injection valve 21 can be restricted, so that an accuracy of the fuel injection control can be improved. According to the above configuration, a variation in fuel injection quantity can be restricted even when the fuel injection quantity is small.

The current slope SL is computed based on time information (Tp, Th) which is defined with respect to a plurality of current values (Ip, Ih). Thus, the current slope SL can be easily computed by use of a timer. Moreover, by defining the reference value Tp_typ of the peak current time, a time error ΔTp and the peak current correction value Kpe can be easily computed.

The slope of the variation in the actual current flowing through the fuel injection valve 21 depends on the coil temperature and the applied voltage. In view of this, the reference value Tp_typ of the peak current time is set variable. Thereby, the time error ΔTp of the peak current time can be corrected accurately, so that the accuracy of the peak current correction can be enhanced.

The difference Vdiff between the first filter voltage Vsm1 and the second filter voltage Vsm2 is computed, and then a time period from when the injection pulse is switched from off to on (the reference timing) until when the difference Vdiff exceeds the threshold Vt is computed as the voltage inflection time Tdiff. Thereby, the voltage inflection time Tdiff which varies according to the valve closing timing of the fuel injection valve 21 can be computed with high accuracy. That is, the valve closing timing of the fuel injection valve 21 can be detected based on a fact in which a variation characteristics of the induced electromotive force generated after the fuel injection valve 21 is deenergized is varied at the valve closing timing.

When the fuel injection pulse Ti corresponds to about ½ Qa, a disperse of the fuel injection quantity is largest. In view of this characteristic, the representative injection pulse width Ti(x) is established in such a manner that the fuel injection quantity is a half of the fuel injection quantity Qa which corresponds to the boundary between the partial lift injection and the full lift injection. Thus, the injection pulse can be corrected by use of the voltage inflection time Tdiff, so that the correction accuracy of the fuel injection quantity can be improved.

The microcomputer 35 corrects the electric power supply from the injector drive IC 36 in order that the actual value of the drive current detected by the current sensor 61 agrees with the target value. Thus, even when the detected value of the driving current detected by the current sensor 61 deviates from the actual value, or the flow easiness of the drive current for the fuel injection valve 21 is varied, the actual value of the drive current can be approximated to the target value. A dispersion in valve opening operation of the fuel injection valve 21 can be restricted. Furthermore, since the electric power supply from the injector drive IC 36 is corrected so that the actual value of the driving current agrees with the target value, it is unnecessary to bring the fuel injector valve 21 to a full close position, which is applicable to the partial lift injection.

In a condition where the electric supply from the injector drive IC 36 is corrected by the microcomputer 35, the ECU 30 detects the valve closing timing of the fuel injection valve 21 based on the terminal voltage detected by the voltage sensor 62. Thus, in a condition where a dispersion in valve opening operation of the fuel injection valve 21 is restricted, the valve closing timing can be detected, so that the valve closing timing can be detected with high accuracy.

By controlling the peak value of the driving current of the fuel injection valve 21, the valve opening operation of the fuel injection valve 21 can be controlled with high accuracy. According to the present embodiment, the microcomputer 35 corrects the electric power supply from the injector drive IC 36 so that the actual value of the peak value of the driving current detected by the current sensor 61 agrees with the target value. Therefore, the valve close timing can be detected under a condition where the dispersion in the valve opening operation of the fuel injection valve 21 is restricted, whereby the valve close timing can be detected more accurately.

While the catalyst 25 is warmed up, a pilot-injection and an after-injection are conducted by the fuel injection valve 21 during one combustion cycle of the engine 11. By decreasing the fuel injection quantity in the after-injection while the catalyst 25 is warmed up, the partial lift injection can be performed in the after-injection. By detecting the valve closing timing in the partial lift injection during the after-injection, a chance for detecting the valve opening timing in the partial lift injection can be ensured. Furthermore, while the catalyst 25 is warmed up, the after-injection is conducted to increase the catalyst temperature. Thus, it is restricted that the exhaust emission is deteriorated due to the partial lift injection.

The ECU 30 controls the air-fuel ratio to the target air-fuel ratio. The ECU 30 controls the air-fuel ratio to the target air-fuel ratio by correcting the fuel injection quantity in the pilot-injection when detecting the valve closing timing. Thus, while the catalyst 25 is warmed up, the partial lift injection is conducted to detect the valve closing timing and the air-fuel ratio is controlled to the target air-fuel ratio.

Based on the valve closing timing and the required fuel injection quantity detected by the ECU 30, the electric power supplied from the injector drive IC 36 is computed. The detected valve closing timing is reflected on the supply electric power, so that the fuel of the required fuel quantity can be injected with high accuracy.

The above described embodiment can be modified as follows.

A pre-charge of the fuel injection valve 21 is not always necessary. Instead of correcting the input energy by the pre-charge, the voltage of the power supply for applying the high voltage V2 may be corrected.

A high voltage power supply outputting the high voltage V2 may include a booster circuit boosting the battery voltage, or a high-voltage battery.

The computing portion 37 of the injector drive IC 36 computes a third filter voltage Vdiff.sm3 which is obtained by filtering the difference Vdiff with a third low-pass filter of which cut-off frequency is a third frequency f3 lower than the noise, and the fourth filter voltage Vdiff.sm4 which is obtained by filtering the difference Vdiff with a fourth low-pass filter of which cut-off frequency is the fourth frequency f4 lower than the third frequency f3. Furthermore, a second-order difference Vdiff2 (=Vdiff.sm3−Vdiff.sm4) of the difference between the third filter voltage Vdiff.sm3 and the fourth filter voltage Vdiff.sm4 is computed. A timing at which the second-order difference Vdiff2 becomes an extreme value (at which the second-order difference Vdiff2 does not increase) is computed as a timing at which the difference Vdiff becomes the inflection point so as to compute the voltage inflection time Tdiff. That is, a time period from the reference timing until the second-order difference Vdiff2 becomes an extreme value is computed as the voltage inflection time Tdiff. Thereby, the voltage inflection time Tdiff which varies according to the valve closing timing of the fuel injection valve 21 can be computed accurately at early timing.

The first to the fourth low-pass filter are not limited to digital filters. Each of the first to the fourth low-pass filters may be an analog filter.

The voltage inflection time may be computed by use of a positive terminal voltage of the fuel injection valve 21.

The accuracy of the valve opening operation of the fuel injection valve can be improved also by controlling an integrated value of a drive current of the fuel injection valve 21 until the drive current reaches a peak value. The microcomputer 35 may correct the electric power supplied from the injector drive IC 36 so that the actual value of the integrated value of the drive current detected by the current sensor 61 agrees with the target value. According to the above configuration, the valve closing timing can be accurately detected while a dispersion in valve opening operation of the fuel injection valve 21 is restricted.

Generally, a full lift injection is conducted more often than a partial lift injection. When the full lift injection is conducted, the microcomputer 35 may correct the electric power supplied from the injector drive IC 36 in order that the actual value of the drive current detected by the current sensor 61 agrees with the target value. With this configuration, an opportunity in which the electric power supplied from the injector drive IC 36 is corrected can be ensured more often. After the electric power supplied from the injector drive IC 36 is corrected during the full lift injection, the valve opening timing can be detected when the partial lift injection is conducted.

This disclosure is described according to the embodiments. However, it is understood that this disclosure is not limited to the above embodiments or the structures. This disclosure includes various modified examples, and modifications falling within an equivalent range. In addition, while the various combinations and configurations, other combinations and configurations, including more, less or only a single element, are also within the spirit and scope of the present disclosure.

The invention claimed is:

1. A control device configured to control a fuel injection in an internal combustion engine provided with a fuel injection valve, the control device comprising:
    a current sensor configured to detect a drive current flowing through the fuel injection valve when the fuel injection valve is driven to be opened;
    a voltage sensor configured to detect a terminal voltage of a terminal of the fuel injection valve;
    a controller comprising:
        driving circuitry configured to supply an electric power to the terminal of the fuel injection valve so as to drive the fuel injection valve to be opened;
        a memory configured to store a target value of the drive current in a condition where the driving circuitry applies a predetermined voltage to the terminal; and
        a computer programmed to compute a deviation between an actual value of the drive current detected by the current sensor and the target value in the condition where the driving circuitry applies the predetermined voltage to the terminal and correct the electric power supplied by the driving circuitry so that the actual value agrees with the target value;
    wherein the controller is configured to detect a valve closing timing of the fuel injection valve based on the terminal voltage detected by the voltage sensor in a condition where the electric power supplied by the driving circuitry is corrected by the computer and based on a variation in a variation characteristic of an induced electromotive force generated after the supply of the electric power is terminated.

2. A control device configured to control a fuel injection in an internal combustion engine according to claim 1, wherein
    the computer is programmed to correct the electric power supplied from the driving circuitry so that an actual value of a peak value of the drive current detected by the current sensor agrees with a target value.

3. A control device configured to control a fuel injection in an internal combustion engine according to claim 1, wherein
    the computer is programmed to correct the electric power supplied from the driving circuitry so that an actual value of an integrated value of the drive current until the drive current reaches a peak value agrees with a target value.

4. A control device configured to control a fuel injection in an internal combustion engine according to claim 1, wherein
    the internal combustion engine has an exhaust passage in which a catalyst configured to purify an exhaust gas is disposed,
    the fuel injection valve performs a pilot-injection and an after-injection during a single combustion cycle of the internal combustion engine while the catalyst is being warmed up, and
    when the fuel injection valve performs the after-injection at a partial lift position which is prior to a full lift position, the controller detects the valve closing timing.

5. A control device configured to control a fuel injection in an internal combustion engine according to claim 4, wherein:
    the controller is configured to control an air-fuel ratio between an air and a fuel which are supplied to the internal combustion engine so that the air-fuel ratio agrees with a target air-fuel ratio, wherein
    the controller is configured to correct a fuel injection quantity for the pilot-injection when the controller detects the valve closing timing, whereby the air-fuel ratio is controlled to the target air-fuel ratio.

6. A control device configured to control a fuel injection in an internal combustion engine according to claim 1, wherein
    the computer is programmed to correct the electric power supplied from the driving circuitry so that an actual value of the drive current agrees with a target value when the fuel injection valve is positioned at a full lift position, and
    the controller is configured to detect the valve closing timing when the fuel injection valve is positioned at a partial lift position which is prior to the full lift position.

7. A control device configured to control a fuel injection in an internal combustion engine according to claim 1, wherein:
    the controller is configured to compute the electric power supplied from the driving circuitry based on the valve closing timing detected by the controller and a required fuel injection quantity.

8. A control device configured to control a fuel injection in an internal combustion engine according to claim 1, wherein:
    the controller is configured to:
        filter the terminal voltage with a first low-pass filter to compute a first filter voltage;
        filter the terminal voltage with a second low-pass filter, which has a cut-off frequency lower than a cut-off frequency of the first low-pass filter, to compute a second filter voltage;
        compute a difference between the first filter voltage and the second filter voltage;
        compute a voltage inflection time at which the difference becomes an inflection point; and
        estimate a fuel injection quantity corresponding to the voltage inflection time.

9. A control device configured to control a fuel injection in an internal combustion engine according to claim 1, wherein:
    under the condition where the driving circuitry applies the predetermined voltage to the terminal, the controller is configured to compute a slope of variation in the drive current detected by the current sensor and correct the electric power based on the computed slope.

10. A control device configured to control a fuel injection in an internal combustion engine according to claim 1, wherein:
    the driving circuitry is configured to apply a first voltage to the terminal of the fuel injection valve during a pre-charge operation;
    the predetermined voltage is applied to the terminal of the fuel injection valve after the pre-charge operation; and
    the predetermined voltage is higher than the first voltage.

11. A control device configured to control a fuel injection in an internal combustion engine according to claim 1, wherein
    the terminal is connected to a drive coil of the fuel injection valve, and
    the drive coil is configured to generate an electromagnetic force when supplied with power to drive a needle by mean of the electromagnetic force.

12. A control device configured to control a fuel injection in an internal combustion engine according to claim 1, wherein the computer is programmed to correct the electric power supplied by the driving circuitry so that the deviation decreases and the actual value agrees with the target value.

13. A control device configured to control a fuel injection in an internal combustion engine provided with a fuel injection valve, the control device comprising:
- a current sensor configured to detect a drive current flowing through the fuel injection valve when the fuel injection valve is driven to be opened;
- a voltage sensor configured to detect a terminal voltage of a terminal of the fuel injection valve;
- a controller comprising:
  - driving circuitry configured to supply an electric power to the terminal of the fuel injection valve so as to drive the fuel injection valve to be opened;
  - a memory configured to store a target value of the drive current in a condition where the driving circuitry applies a predetermined voltage to the terminal; and
  - a computer configured to compute a deviation between an actual value of the drive current detected by the current sensor and the target value in the condition where the driving circuitry applies the predetermined voltage to the terminal and correct the electric power supplied by the driving circuitry so that the actual value agrees with the target value;
- wherein the controller is configured to:
  - detect a valve closing timing of the fuel injection valve based on the terminal voltage detected by the voltage sensor in a condition where the electric power supplied by the driving circuitry is corrected by the computer;
  - filter the terminal voltage with a first low-pass filter to compute a first filter voltage;
  - filter the terminal voltage with a second low-pass filter, which has a cut-off frequency lower than a cut-off frequency of the first low-pass filter, to compute a second filter voltage;
  - compute a difference between the first filter voltage and the second filter voltage;
  - compute a voltage inflection time at which the difference becomes an inflection point; and
  - estimate a fuel injection quantity corresponding to the voltage inflection time.

14. A control device configured to control a fuel injection in an internal combustion engine provided with a fuel injection valve, the control device comprising:
- a current sensor configured to detect a drive current flowing through the fuel injection valve when the fuel injection valve is driven to be opened;
- a voltage sensor configured to detect a terminal voltage of a terminal of the fuel injection valve;
- a controller comprising:
  - driving circuitry configured to supply an electric power to the terminal of the fuel injection valve so as to drive the fuel injection valve to be opened;
  - a memory configured to store a target value of the drive current in a condition where the driving circuitry applies a predetermined voltage to the terminal; and
  - a computer configured to compute a deviation between an actual value of the drive current detected by the current sensor and the target value in the condition where the driving circuitry applies the predetermined voltage to the terminal and correct the electric power supplied by the driving circuitry so that the actual value agrees with the target value;
- wherein the controller is configured to detect a valve closing timing of the fuel injection valve based on the terminal voltage detected by the voltage sensor in a condition where the electric power supplied by the driving circuitry is corrected by the computer;
- the driving circuitry is configured to apply a first voltage to the terminal of the fuel injection valve during a pre-charge operation;
- the predetermined voltage is applied to the terminal of the fuel injection valve after the pre-charge operation; and
- the predetermined voltage is higher than the first voltage.

\* \* \* \* \*